United States Patent
Kittaka et al.

(10) Patent No.: US 9,621,748 B2
(45) Date of Patent: Apr. 11, 2017

(54) INFORMATION PROCESSING SYSTEM, INFORMATION PROCESSING APPARATUS, AND INFORMATION PROCESSING METHOD

(71) Applicants: Fumiyoshi Kittaka, Kanagawa (JP); Tadashi Nagata, Kanagawa (JP)

(72) Inventors: Fumiyoshi Kittaka, Kanagawa (JP); Tadashi Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/558,221

(22) Filed: Dec. 2, 2014

(65) Prior Publication Data
US 2015/0156348 A1    Jun. 4, 2015

(30) Foreign Application Priority Data
Dec. 4, 2013   (JP) .................. 2013-251077

(51) Int. Cl.
G06F 3/12       (2006.01)
H04N 1/00       (2006.01)

(52) U.S. Cl.
CPC ....... *H04N 1/00307* (2013.01); *G06F 3/1207* (2013.01); *G06F 3/1234* (2013.01); *G06F 3/1259* (2013.01); *G06F 3/1292* (2013.01); *H04N 1/00079* (2013.01); *H04N 1/00411* (2013.01); *G06F 3/121* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,745,602 A | * | 5/1988 | Morrell | G06F 11/0733 714/2 |
| 7,227,651 B2 | * | 6/2007 | Kamiya | G03G 15/55 358/1.13 |
| 7,656,560 B2 | * | 2/2010 | Kasamatsu | H04N 1/0035 358/1.15 |

(Continued)

FOREIGN PATENT DOCUMENTS

| | | |
|---|---|---|
| EP | 2085873 A2 | 8/2009 |
| EP | 2549373 A2 | 1/2013 |

(Continued)

OTHER PUBLICATIONS

Extended European Search Report dated May 7, 2015 issued in corresponding European Application No. 14195040.2.

*Primary Examiner* — Ted Barnes
(74) *Attorney, Agent, or Firm* — Harness, Dickey & Pierce, P.L.C.

(57) ABSTRACT

An information processing apparatus is disclosed. The information processing apparatus includes a display unit which displays a screen in which is performed an operation for controlling another apparatus; and a control unit which manages an error occurring in the other apparatus and controls displaying/non-displaying of error information which indicates an occurrence of the error, wherein the control unit controls the displaying/non-displaying of the error information based on a relationship between the error occurring and the screen displayed by the display unit.

19 Claims, 19 Drawing Sheets

(56) References Cited

U.S. PATENT DOCUMENTS

| | | | | |
|---|---|---|---|---|
| 2002/0118383 A1* | 8/2002 | Kamiya | G03G 15/55 | 358/1.13 |
| 2003/0077097 A1* | 4/2003 | Parry | G06F 3/121 | 400/74 |
| 2005/0134893 A1* | 6/2005 | Han | G06F 3/121 | 358/1.14 |
| 2006/0044572 A1 | 3/2006 | Nakayama | | |
| 2006/0080571 A1* | 4/2006 | Ichinowatari | G06F 11/328 | 714/4.1 |
| 2006/0244681 A1* | 11/2006 | Nakajima | G09F 9/33 | 345/46 |
| 2008/0010519 A1* | 1/2008 | Beyer | G06F 11/326 | 714/21 |
| 2008/0065739 A1* | 3/2008 | Kumar | H04L 43/0817 | 709/217 |
| 2009/0190155 A1 | 7/2009 | Sugimoto | | |
| 2009/0203330 A1* | 8/2009 | Arimoto | H04M 1/72505 | 455/90.2 |
| 2010/0208299 A1* | 8/2010 | Sakuda | G06F 3/1285 | 358/1.15 |
| 2010/0225962 A1* | 9/2010 | Okigami | H04L 63/0492 | 358/1.15 |
| 2011/0069340 A1* | 3/2011 | Asai | G06F 3/121 | 358/1.15 |
| 2011/0199645 A1* | 8/2011 | Ito | G06F 3/121 | 358/1.15 |
| 2012/0019581 A1* | 1/2012 | Miura | B41J 2/16585 | 347/14 |
| 2012/0050784 A1* | 3/2012 | Kawaura | G06F 3/1207 | 358/1.14 |
| 2012/0069380 A1* | 3/2012 | Sugimoto | G06F 3/1205 | 358/1.14 |
| 2012/0133966 A1* | 5/2012 | Sako | H04N 1/00222 | 358/1.13 |
| 2012/0162710 A1* | 6/2012 | Kawabata | H04N 1/00244 | 358/1.15 |
| 2012/0243029 A1* | 9/2012 | St. Jacques, Jr. | G06F 3/1204 | 358/1.15 |
| 2012/0250070 A1* | 10/2012 | Sakamoto | G06F 3/121 | 358/1.14 |
| 2013/0021641 A1* | 1/2013 | Park | G06F 3/121 | 358/1.14 |
| 2013/0044346 A1* | 2/2013 | Ito | H04N 1/00244 | 358/1.14 |
| 2013/0070298 A1* | 3/2013 | Watanabe | G06F 3/1203 | 358/1.15 |
| 2013/0242325 A1* | 9/2013 | Ishikawa | H04N 1/00076 | 358/1.13 |
| 2013/0242336 A1* | 9/2013 | Koshigaya | G06K 15/408 | 358/1.14 |
| 2013/0321832 A1* | 12/2013 | Sugiyama | H04N 1/00029 | 358/1.13 |
| 2014/0063042 A1* | 3/2014 | Hernandez | G06F 8/38 | 345/592 |
| 2014/0082544 A1* | 3/2014 | Umeizumi | H04N 1/00411 | 715/772 |
| 2014/0085677 A1* | 3/2014 | Saito | H04N 1/00129 | 358/1.15 |
| 2014/0168714 A1* | 6/2014 | Sawayanagi | H04N 1/0044 | 358/3.28 |
| 2014/0247467 A1* | 9/2014 | Kato | H04N 1/00482 | 358/1.15 |
| 2014/0307282 A1* | 10/2014 | Sato | H04N 1/00307 | 358/1.14 |
| 2015/0049358 A1* | 2/2015 | Okigami | H04L 63/0492 | 358/1.14 |
| 2015/0091830 A1* | 4/2015 | Miyazaki | G06F 3/0488 | 345/173 |
| 2015/0092229 A1* | 4/2015 | Miyazaki | H04N 1/00411 | 358/1.15 |
| 2015/0120491 A1* | 4/2015 | Bisht | G06F 17/30873 | 705/26.5 |
| 2015/0181069 A1* | 6/2015 | Tani | H04N 1/00973 | 358/1.14 |

FOREIGN PATENT DOCUMENTS

| | | |
|---|---|---|
| JP | H11-008727 | 1/1999 |
| JP | 2004-066502 | 3/2004 |
| JP | 2005-064762 | 3/2005 |
| JP | 2007-304936 | 11/2007 |
| JP | 2007-304937 | 11/2007 |
| JP | 2014-053748 | 3/2014 |

* cited by examiner

FIG.8

| NUMBER | USE REGISTRATION TERMINAL |
|---|---|
| 1 | IP ADDRESS:aa. aa. aa. aa |
| 2 | IP ADDRESS:bb. bb. bb. bb |
| 3 | IP ADDRESS:cc. cc. cc. cc |
| 4 | IP ADDRESS:dd. dd. dd. dd |
| 5 | IP ADDRESS:ee. ee. ee. ee |
| 6 | IP ADDRESS:ff. ff. ff. ff |
|  |  |

| NUMBER | ERROR OVERVIEW INFORMATION | ERROR INFORMATION DETAIL |
|---|---|---|
| 1 | PRINT ERROR | PAPER FEED TRAY 1 PAPER JAM |
| 2 | PRINT ERROR | FINISHER PAPER DISCHARGE TRAY PAPER JAM |
| 3 | | |
| 4 | | |
| 5 | | |
| 6 | | |
| | | |

FIG.14

|                | SCANNER HARDWARE UNIT | PLOTTER HARDWARE UNIT |
|----------------|:---------------------:|:---------------------:|
| COPY FUNCTION  | ○ | ○ |
| SCAN FUNCTION  | ○ |   |
| FAX FUNCTION   | ○ |   |
| PRINT FUNCTION |   | ○ |

FIG.18

| NUMBER | USE REGISTRATION TERMINAL | WHETHER ERROR REPORT IS REQUIRED |
|---|---|---|
| 1 | IP ADDRESS: aa. aa. aa. aa | REQUIRED |
| 2 | IP ADDRESS: bb. bb. bb. bb | REQUIRED |
| 3 | IP ADDRESS: cc. cc. cc. cc | REQUIRED |
| 4 | IP ADDRESS: dd. dd. dd. dd | REQUIRED |
| 5 | IP ADDRESS: ee. ee. ee. ee | NOT REQUIRED |
| 6 | IP ADDRESS: ff. ff. ff. ff | REQUIRED |
| | | |

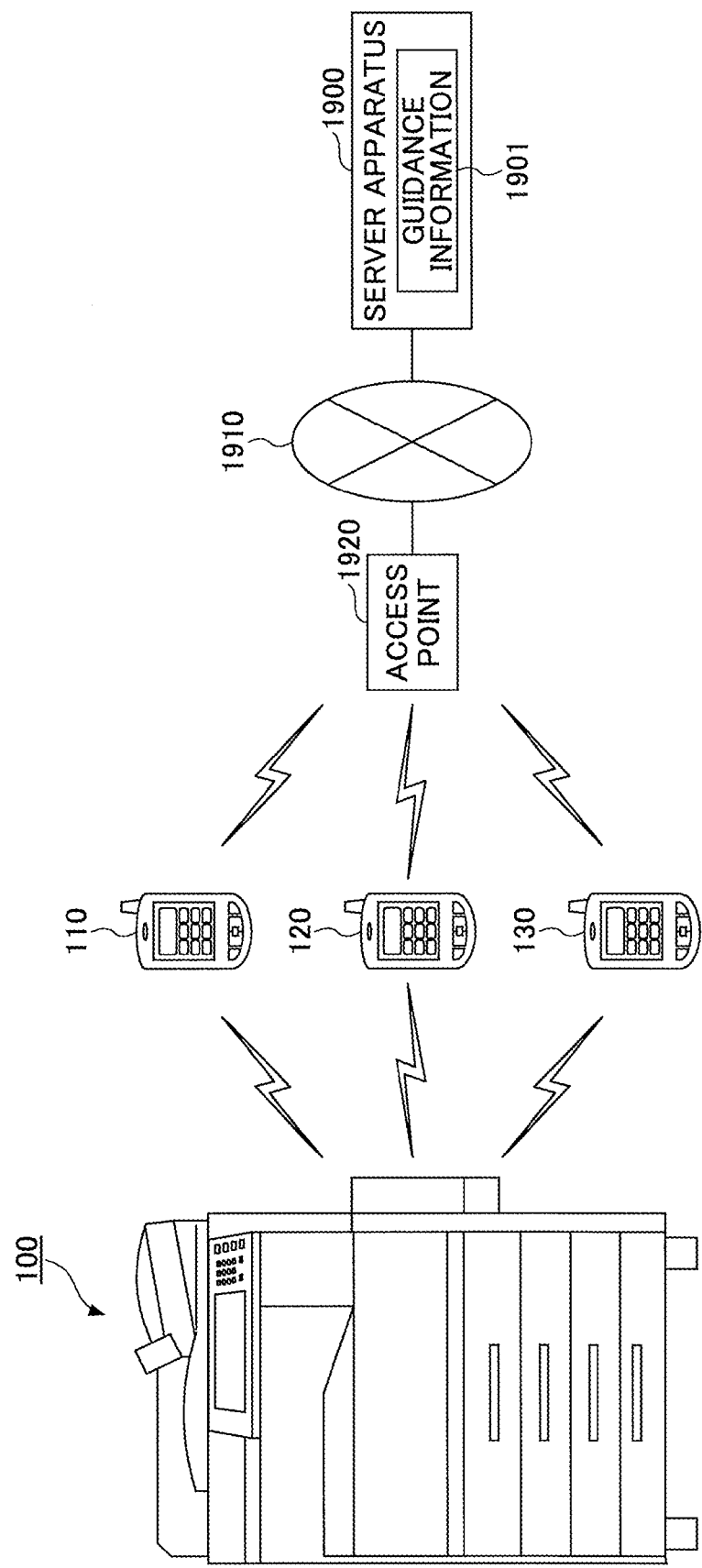

INFORMATION PROCESSING SYSTEM, INFORMATION PROCESSING APPARATUS, AND INFORMATION PROCESSING METHOD

TECHNICAL FIELD

The present invention relates to information processing systems, information processing apparatuses, and information processing methods.

BACKGROUND ART

In recent years, there are proposed related-art image processing apparatuses such as MFPs (Multi-functional peripherals), wherein an information processing apparatus such as a mobile terminal, etc., is caused to function as an operation unit, making it possible to control the information processing apparatus with a remote operation even from a distant location.

In such image processing apparatuses, if an error occurs during an execution of a job, for example, error reporting is made to a mobile terminal which instructed the execution of the job to inform a user of the occurrence of the error (see Patent Documents 1 and 2, for example).

PATENT DOCUMENT

Patent Document 1: JP2007-304937A
Patent Document 2: JP2007-304936A

However, if it is arranged for an image processing apparatus to restrict a destination to which the error reporting is made to only the mobile terminal which instructed the execution of the job, inconveniences arise that a user wishing to use the image processing apparatus via another mobile terminal is not able to be informed of the occurrence of the error.

On the other hand, if it is arranged for the image processing apparatus to make the error reporting to all of the mobile terminals which can be controlled with the remote operation, the error reporting is made to even a mobile terminal which is performing an operation not related to the error, causing error information to be displayed, which is troublesome.

In light of the above, it is desirable from a point of view of the convenience of the user to arrange the image processing apparatus such that, if the error occurs in the image processing apparatus, the error information is displayed only on the mobile terminal of the user which requires the error reporting.

DISCLOSURE OF THE INVENTION

In light of the problems described above, an object of the present invention is to improve the convenience of a user which controls another apparatus with a remote operation via an information processing apparatus.

According to an embodiment of the present invention, an information processing apparatus includes a display unit which displays a screen in which is performed an operation for controlling another apparatus; and a control unit which manages an error occurring in the other apparatus and controls displaying/non-displaying of error information which indicates an occurrence of the error, wherein the control unit controls the displaying/non-displaying of the error information based on a relationship between the error occurring and the screen displayed by the display unit.

The embodiments of the present invention make it possible to improve the convenience of a user which controls another apparatus with a remote operation via an information processing apparatus.

BRIEF DESCRIPTION OF THE DRAWINGS

Other objects, features, and advantages of the present invention will become more apparent from the following detailed descriptions when read in conjunction with the accompanying drawings, in which:

FIG. 8 is a diagram illustrating one example of a use registration terminal table in which the use registration of the mobile terminal is made;

FIG. 11 is a diagram illustrating one example of an error information management table which is managed in the image processing apparatus;

FIG. 14 is a diagram for explaining a relationship between an image processing function included in the image processing apparatus and error information;

FIG. 18 is a diagram illustrating another example of the use registration terminal table in which the use registration of the mobile terminal is made; and FIG. 19 is a diagram illustrating another exemplary information processing system which includes the mobile terminal (the information processing apparatus) and the image processing apparatus which is controlled with the remote operation via the mobile terminal according to an embodiment.

BEST MODE FOR CARRYING OUT THE INVENTION

Below embodiments of the present invention are described with reference to the drawings. In the present specification and drawings, elements having substantially the same functional features are given the same letters, so that repeated explanations will be omitted.

First Embodiment

Overall Configuration of Information Processing System

Figure 1:
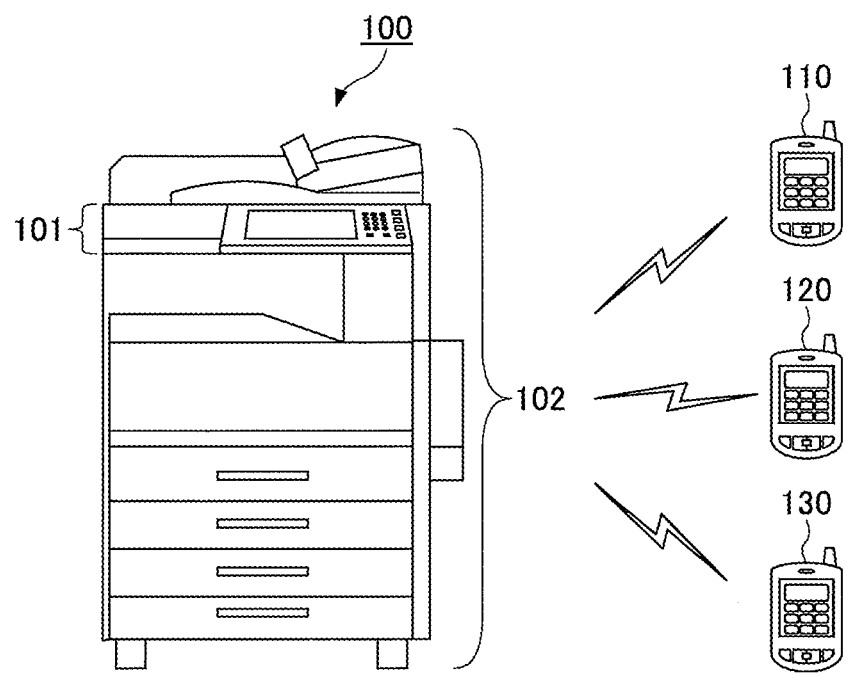
FIG. 1 is a diagram illustrating an exemplary information processing system which includes a mobile terminal (an information processing apparatus) and an image processing apparatus which is controlled with a remote operation via the mobile terminal according to the present embodiment.

First, the overall configuration of an information processing system including mobile terminals (an information processing apparatuses) and an image processing apparatus according to the present embodiment is described. FIG. 1 is a diagram illustrating an overall configuration of an information processing system including mobile terminals (information processing apparatuses) 110-130 and an image processing apparatus 100 according to the present embodiment.

In FIG. 1, the image processing apparatus 100 is an MFP (multifunctional peripheral) and includes image processing functions such as a copy function, a scan function, a fax function, a print function, etc., for example Moreover, it includes various functions including functions (an error display function, etc., for example) related to the image processing functions.

As shown in FIG. 1, the image processing apparatus 100 includes an operation unit 101 and a main body 102.

The operation unit 101 is used when a user performs various operations such as selecting the image processing function to be caused to be executed by the main body 102, inputting various setting values for causing the image processing function to be executed, switching a display screen, etc.

The main body 102 executes information processing for realizing various functions including the image processing functions and the functions (the error display function, etc., for example) related to the image processing functions.

The mobile terminals 110-130 are configured such that they can function as an operation unit of the image processing apparatus 100 and control the image processing apparatus 100 with a remote operation even from a distant location. Moreover, they are configured such that they can receive an error report and display error information if an error occurs in the image processing apparatus 100.

The mobile terminals 110-130 include a PC (personal computer), a tablet terminal, and a portable information terminal such as a smartphone, a mobile telephone, a PDA, etc. Moreover, while only three mobile terminals which function as the operation unit of the image processing apparatus 100 are illustrated in an example in FIG. 1, the number of mobile terminals is not limited thereto, so that it may be any number.

Hardware Configuration of Image Processing Apparatus

Figure 2:
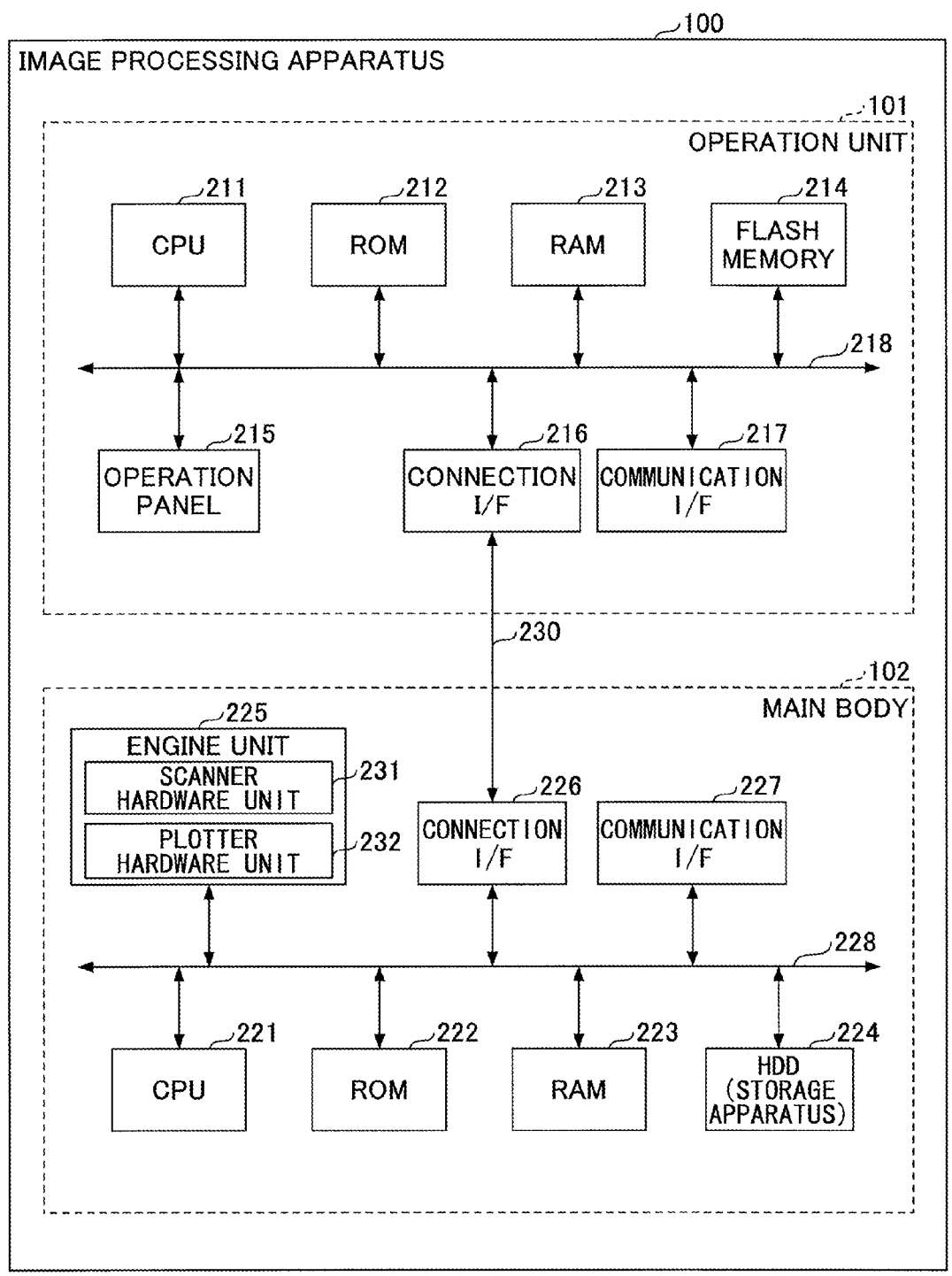
FIG. 2 is a diagram illustrating a hardware configuration of an operation unit and a main body that make up the image processing apparatus.

Next, a hardware configuration of the image processing apparatus 100 is described. FIG. 2 is a diagram illustrating the hardware configuration of the image processing apparatus 100.

As shown in FIG. 2, an operation unit 101 of the image processing apparatus 100 includes a CPU (computer) 211, a ROM 212, a RAM 213, a flash memory 214, an operation panel 215, a connection I/F 216, and a communication I/F 217. The respective elements which make up the operation unit 101 are mutually connected via a bus 218.

The CPU 211 executes various programs stored in the ROM 212 or the flash memory 214 with the RAM 213 as a work area to control the overall operation unit 101.

The flash memory 214 is a non-volatile storage medium and stores therein various data and various programs to be executed by the CPU 211.

The operation panel 215 is used when a user carries out various operations. Moreover, the internal state of the image processing apparatus 100 is displayed.

The connection I/F 216 is an interface for communicating with the main body 102 via the communication unit 230. Here, an USB standard interface is used.

The communication I/F 217 is an interface for communicating with the mobile terminals 110-130.

Similarly, the main body 102 of the image processing apparatus 100 includes a CPU (computer) 221, a ROM 222, a RAM 223, a storage apparatus 224 such as an HDD (hard disk drive), an engine unit 225, a connection I/F 226, and a communication I/F 227. The respective elements which make up the main body 102 are mutually connected via a bus 228.

The CPU 221 executes various programs stored in the ROM 222 or the storage apparatus 224 with the RAM 223 as a work area to control the overall main body 102 and also to realize various functions (including the below-described error display function).

The storage apparatus 224 is a non-volatile storage medium and stores various data and various programs (including programs for realizing the below-described error display function) to be executed by the CPU 221.

The engine unit 225 is a hardware unit which performs information processing for realizing the image processing functions such as the copy, scan, fax, print functions, etc. The engine unit 225 includes a scanner hardware unit 231 which scans a document to read the scanned document and a plotter hardware unit 232 which prints onto a sheet material such as paper, etc. Moreover, it may include a communication unit which conducts a fax communication, a finisher which sorts printed sheet materials, an ADF (automatic document feeding apparatus) which automatically feeds the document, etc.

The connection I/F 226 is an interface for communicating with the operation unit 101 via the communication unit 230. Here, an USB standard interface is used.

The communication I/F 227 is an interface for communicating with the mobile terminals 110-130. The mobile terminals 110-130 may be configured such that they connect to a communication I/F 217 of the operation unit 101 to conduct communication with the main body 102, or may be configured such that they connect to the communication I/F 227 of the main body 102 to conduct communication directly with the main body 102.

Figure 3:
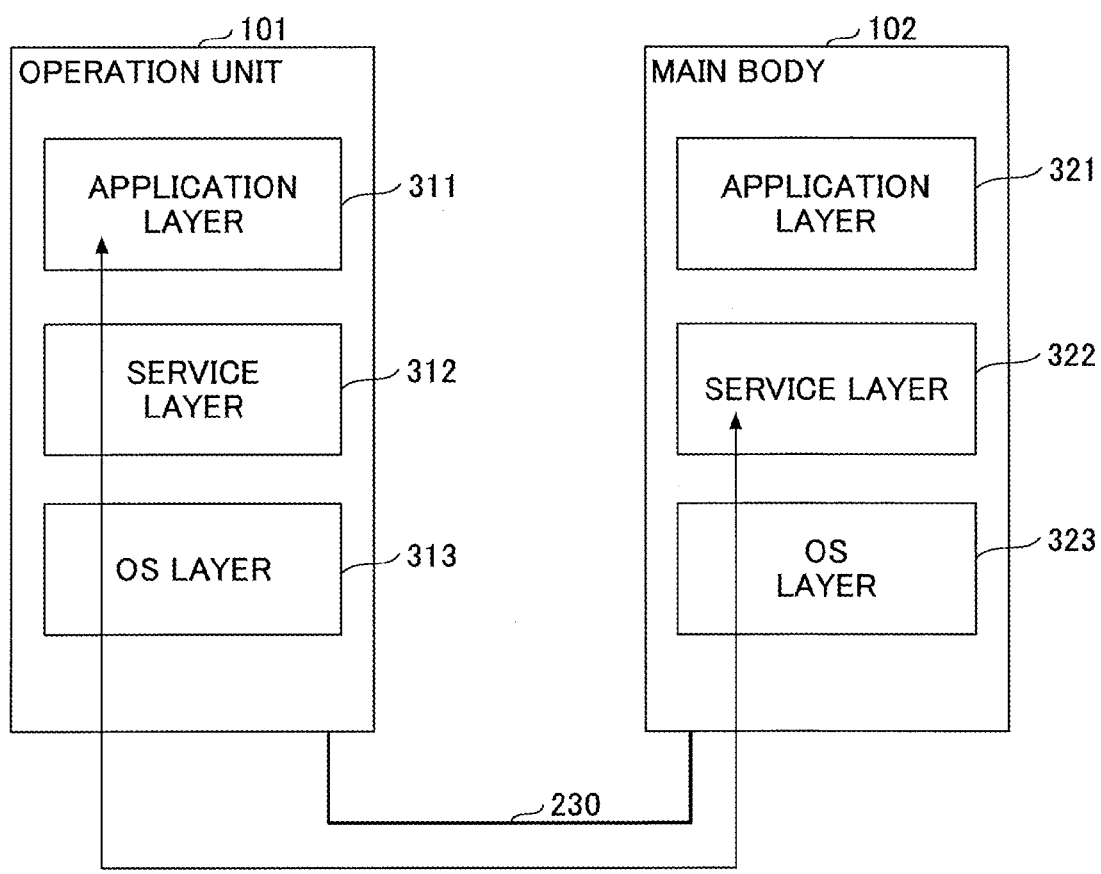
FIG. 3 is a diagram illustrating a hierarchical structure of program groups included in the operation unit and the main body that make up the image processing apparatus.

Hierarchical Structure of Programs Included in Operation Unit and Main Body of Image Processing Apparatus Next, a hierarchical structure of program groups included in the operation unit 101 and the main body 102 of the image processing apparatus 100 is described. FIG. 3 is a diagram illustrating the hierarchical structure of the program groups included in the operation unit 101 (the ROM 212, the flash memory 214) and the main body 102 (the ROM 222, the storage apparatus 224).

First, the hierarchical structure of the program groups included in the main body 102 (the ROM 222, the storage apparatus 224) is described. The program groups included in the main body 102 may generally be divided into an application layer 321 a service layer 322, and an OS layer 323. Programs divided into the application layer 321 are programs for causing hardware resources to be operated to realize image processing functions. More specifically, they include a copy application, a scan application, a fax application, a print application, etc.

Programs divided into the service layer 322 are programs which lie between the application layer 321 and the OS layer 323. The programs serve a role as an interface for the programs in the application layer 321 to use hardware resources included in the main body 102 or to report the status of the hardware resources included in the main body 102.

More specifically, they accept an operation request to the hardware resources or arbitrate the operation request accepted. Moreover, an error detected in the hardware resources is included in an error report as error information to transmit the error report. The operation request accepted by the service layer 322 includes an operation request for reading with a scanner, printing by a plotter, etc., for example.

The role as the interface that is served by the programs divided into the service layer 322 is also the same for the application layer 311 of the operation unit 101. In other words, the programs divided into the application layer 311 of the operation unit 101 may also access the service layer 322 to cause the hardware resources of the main body 102 to be operated to realize the image processing functions.

The OS layer 323 includes programs called basic software and provides basic functions for controlling the hardware resources included in the main body 102. The programs divided into the service layer 322 translate the operation request to the hardware resources from the programs divided into the application layer 321 to a command which can be interpreted by the OS layer 323 to pass on the translated results to the OS layer 323. Then, the command is executed by the programs divided into the OS layer 323, so that information processing for realizing the image processing functions in response to the operation request to the hardware resources is executed. Moreover, executing the programs divided into the OS layer 323 causes the process to be passed on to the service layer 322, which receives the error detected in the hardware resources and includes it in the error report as the error information to transmit the error report.

Next, a hierarchical structure of program groups included in the operation unit 101 (the ROM 212, the flash memory 214) is described. In a manner similar to the main body 102, program groups included in the operation unit 101 may also be divided into the application layer 311, the service layer 312, and the OS layer 313.

The functions provided by the programs divided into the application layer 311 and the type of the operation request which can be accepted by the service layer 312 differ from those in the main body 102. The programs divided into the application layer 311 of the operation unit 101 mainly provide a user interface function for performing various operations and displaying.

According to the present embodiment, operating systems are to operate independently between the operation unit 101 and the main body 102. Moreover, if the operation unit 101 and the main body 102 can mutually communicate, the operating systems do not have to be of the same type. For example, it is possible to use Android (registered trademark) in the operation unit 101 and Linux (registered trademark) in the main body 102.

In this way, the operation unit 101 and the main body 102 are controlled by different operating systems in the image processing apparatus 100, so that communications between the operation unit 101 and the main body 102 are conducted not as inter-process communications within one apparatus, but as communications between different apparatuses.

An operation of transmitting a command indicating various operations of a user accepted by the operation unit 101 (command communications) and an operation of transmitting an event in which the main body 102 instructs displaying of a display screen to the operation unit 101.

Hardware Configuration of Mobile Terminal

Figure 4:
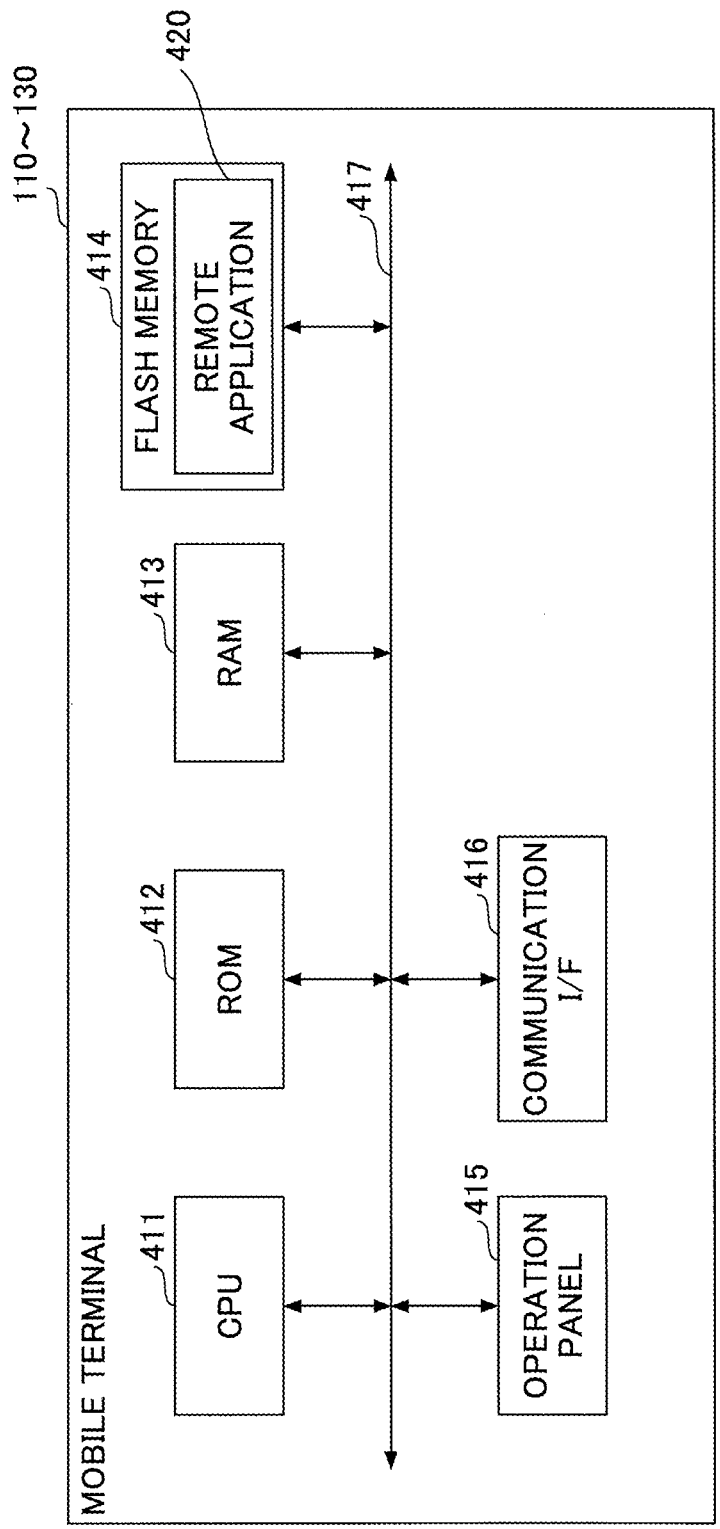
FIG. 4 is a diagram illustrating a hardware configuration of the mobile terminal (the information processing apparatus) according to the present embodiment.

Next, a hardware configuration of the mobile terminals 110-130 is described. FIG. 4 is a diagram illustrating the hardware configuration of the mobile terminals 110-130.

As shown in FIG. 4, the mobile terminals 110-130 include a CPU (computer) 411, a ROM 412, a RAM 413, a flash memory 414, an operation panel 415, and a communication I/F 416. The respective elements which make up the mobile terminals 110-130 are mutually connected via a bus 417.

The CPU 411 executes various programs stored in the ROM 412 or the flash memory 414 with the RAM 413 as a work area to control all of the mobile terminals 110-130 and also to realize the below-described error display function.

The flash memory 414 is a non-volatile storage medium and stores therein various data and various programs to be executed by the CPU 411. Various programs to be executed by the CPU 411 include programs for a remote application 420 for causing the mobile terminals 110-130 to function as the operation unit of the image processing apparatus 100 and controlling the image processing apparatus 100 with a remote operation.

The operation panel 415 is used when a user performs various operations. Moreover, it causes the internal state of the mobile terminals 110-130 to be displayed and a display screen of an application (for example, the remote application 420) to be installed in the mobile terminals 110-130 to be displayed.

The connection I/F 216 is an interface for connecting with the communication I/F 227 of the operation unit 102 or the communication I/F 217 of the operation unit 101 of the image processing apparatus 100 to communicate with the image processing apparatus 100. The communications with the image processing apparatus 100 is to be realized via a wireless network (Wi-Fi, etc.), for example. The present invention is not limited to communications in accordance with specific standards, so that communications can be conducted in accordance with any arbitrary standards.

Explanations on Display Screen of Mobile Terminal

Figure 5:
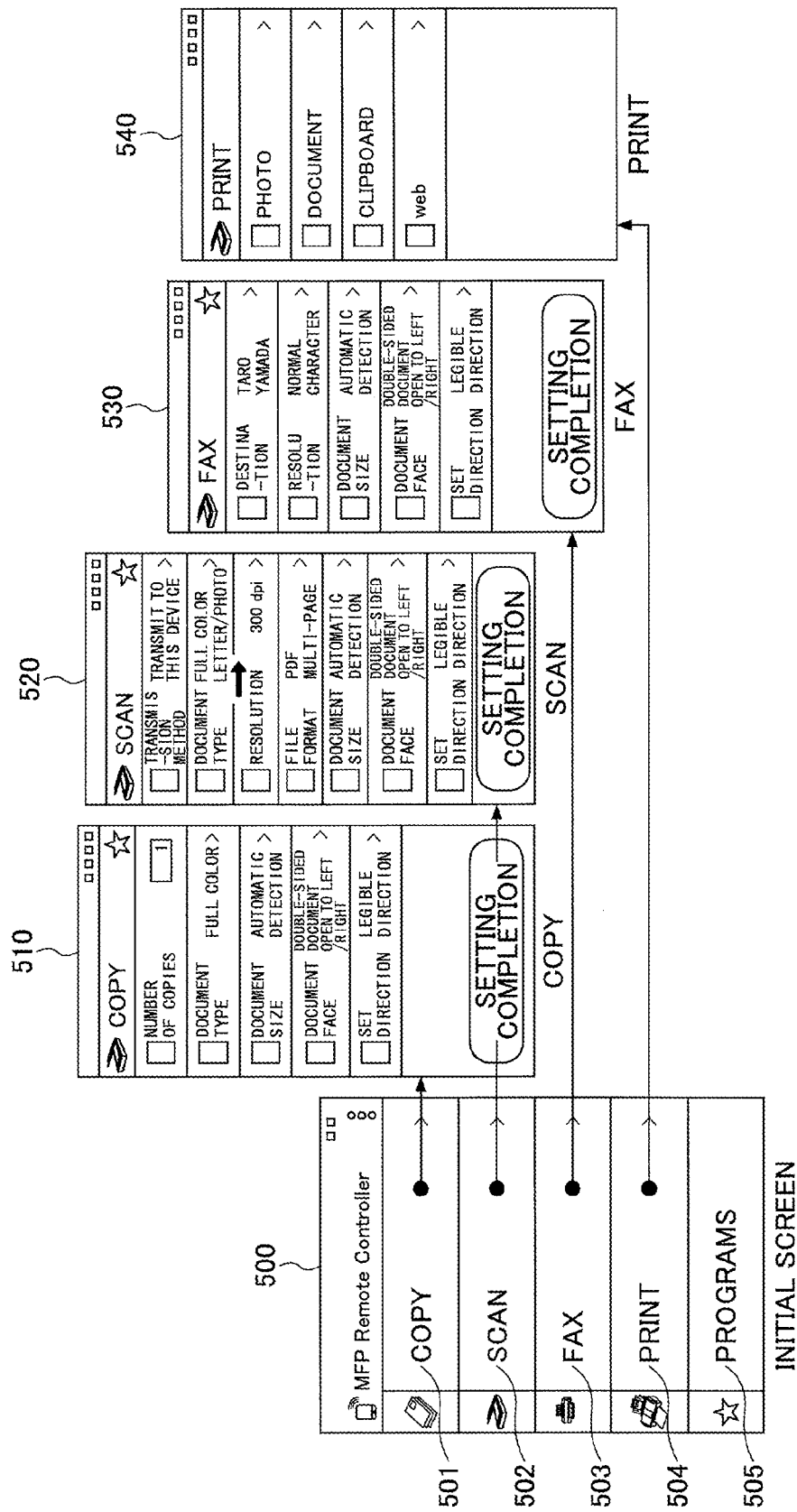
FIG. 5 is a diagram illustrating one example of a display screen which is displayed on an operation panel of the mobile terminal.

Next, the display screen displayed on the operation panel 415 of the mobile terminals 110-130 is explained using FIG. 5. As described above, the mobile terminals 110-130 have the remote application 420 installed for functioning as the operation unit of the image processing apparatus 100. The user activates the remote application 420 to perform various operations such as selecting an image processing function of the image processing apparatus 100, inputting various setting values for causing the image processing functions to be executed, inputting execution instructions for causing the image processing functions to be executed, switching the display screen, etc.

In FIG. 5, an initial screen 500 is a screen for selecting an image processing function to be executed and is displayed when the remote application 420 is activated. The initial screen 500 includes a copy selection button 501, a scan selection button 502, a fax selection button 503, a print selection button 504, and a program selection button 505.

When the copy selection button 501 is pressed, a copy screen 510 is displayed on which various setting values can be input for causing a copy function to be executed. When the copy selection button 510 is pressed and the copy screen 510 is displayed, the mobile terminals 110-130 recognize that the user is now in "a state of trying to use the copy function".

When the scan selection button 502 is pressed, a scan screen 520 is displayed on which various setting values can be input for causing a scan function to be executed. When the scan selection button 502 is pressed and the scan screen 520 is displayed, the mobile terminals 110-130 recognize that the user is now in "a state of trying to use the scan function".

When the fax selection button 503 is pressed, a fax screen 530 is displayed on which various setting values can be input for causing a fax function to be executed. When the fax selection button 503 is pressed and the fax screen 530 is displayed, the mobile terminals 110-130 recognize that the user is now in "a state of trying to use the fax function".

When the print selection button 504 is pressed, a print screen 540 is displayed on which various setting values can be input for causing a print function to be executed. When the print selection button 504 is pressed and the print screen 540 is displayed, the mobile terminals 110-130 recognize that the user is now in "a state of trying to use the print function".

When inputting of various setting values are complete in the respective copy screen 510 to print screen 540, a start button (not shown) is displayed. When the start button is pressed by the user, the mobile terminals 110-130 provide an instruction to execute a corresponding job to the image processing apparatus 100. In other words, when a start button displayed in the respective copy screen 510 to print screen 540 are pressed, the mobile terminals 110-130 recognize that execution of a corresponding job has started.

When execution of the job is completed after starting the job based on the execution instruction from the mobile terminals 110-130, the image processing apparatus 100 reports the completion of the execution of the job to the mobile terminals 110-130. The mobile terminals 110-130 receive the report to recognize that the execution of the job has been completed.

Functional Configuration of Error Display Function

Figure 6:
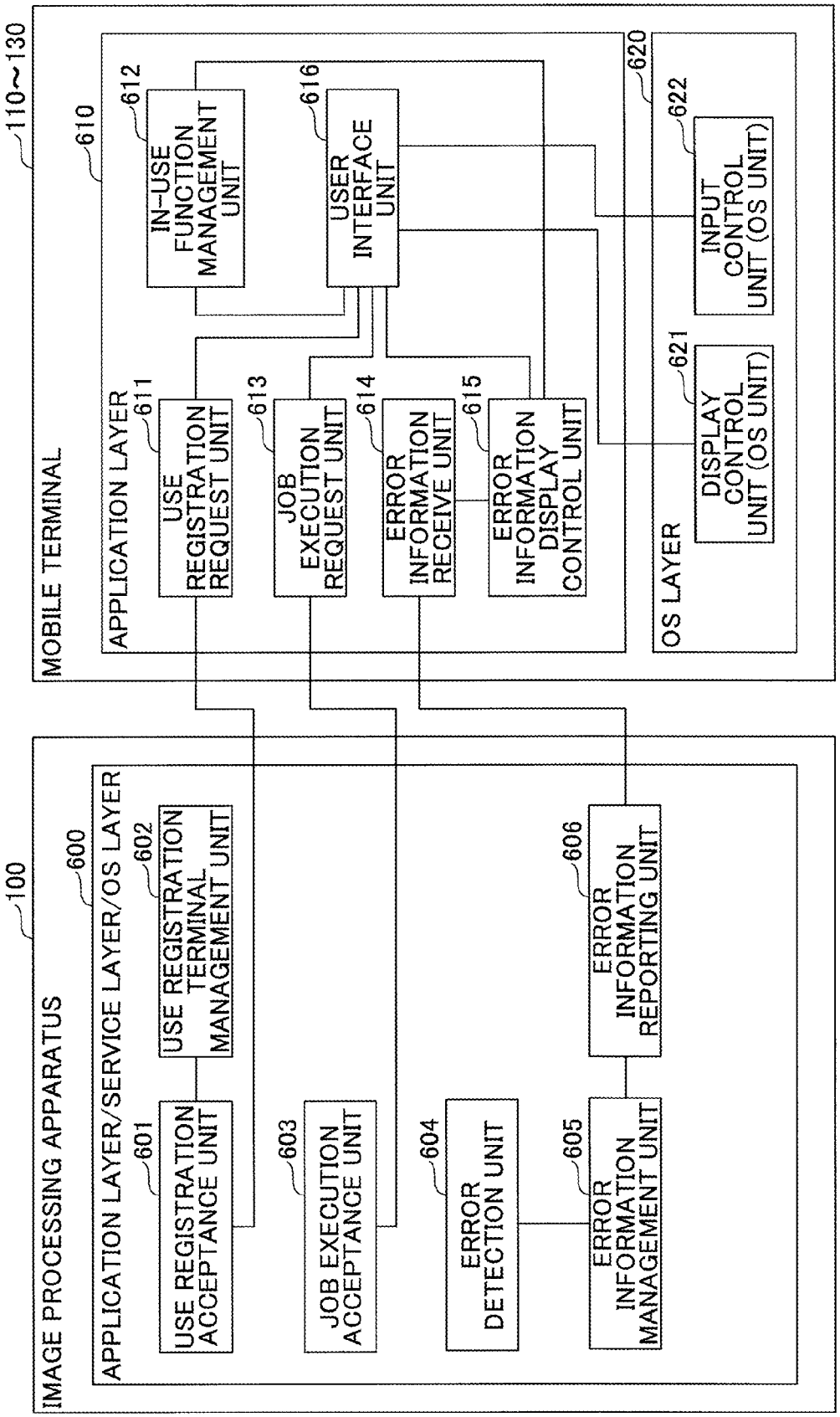
FIG. 6 is a diagram illustrating a functional configuration of an error display function of various functions realized by the program groups included in the image processing apparatus and a remote application installed in the mobile terminal.

Next, the functional configuration of the error display function of various functions realized by the program groups included in the image processing apparatus 100 and the remote application 420 installed in the mobile terminal is described. FIG. 6 is a diagram illustrating the functional configuration of the error display function of the various functions realized by the program groups included in the image processing apparatus 100 and the remote application 420 installed in the mobile terminal 110.

First, the functional configuration of the error display function in the image processing apparatus 100 is described. As shown in FIG. 6, the error display function in the image processing apparatus 100 includes a use registration acceptance unit 601, a use registration terminal management unit 602, a job execution acceptance unit 603, an error detection unit 604, an error information management unit 605, and an error information reporting unit 606.

The use registration acceptance unit 601 accepts a request for use registration as an operation unit from the mobile terminals 110-130. The use registration terminal management unit 602 stores a mobile terminal accepted in the user registration acceptance unit 601 in a use registration terminal table (details will be described below) of the storage apparatus 224.

The job execution acceptance unit 603 accepts an execution instruction for a job (a copy job, a scan job, a fax job, a print job, etc.) from the mobile terminals 110-130. Moreover, an execution request is made for the job for which the execution instruction was accepted to the scanner hardware unit 231 and the plotter hardware unit 232.

If an error such as a paper jam occurs in the scanner hardware unit 231 or the plotter hardware unit 232, the error detection unit 604 detects the error and reports the occurring error as error information to the error information management unit 605.

The error information management unit 605 stores the error information reported from the error detection unit 604 in the error information management table (details will be described below) of the storage apparatus 224. The error information here is information on the occurring error in the image processing apparatus 100. Moreover, based on the use registration terminal table, the mobile terminal for which use registration is made as the operation unit is identified and the mobile terminal to be a reporting destination for the error report including the error information is specified.

The error information reporting unit 606 makes error reporting via a wireless network (Wi-Fi, etc.) to the mobile terminal to be the reporting destination for the error report that is specified by the error information management unit 605.

Next, the error display function in the mobile terminals 110-130 is described. The error display function in the mobile terminals 110-130 is realized in association with the OS layer as one function of the remote application 420 which causes the mobile terminals 110-130 to function as an operation unit of the image processing apparatus 100.

As illustrated in FIG. 6, the error display function in the mobile terminals 110-130 includes a use registration request unit 611 and an in-use function management unit 612 of the application layer 610. Moreover, it includes a job execution request unit 613, an error information receive unit 614, an error information display control unit 615, and a user interface unit 616. Moreover, the OS layer 620 includes a display control unit (an OS unit) 621 and an input control unit (an OS unit) 622.

The in-use registration request unit 611 request the use registration acceptance unit 601 of the image processing apparatus 100 for conducting use registration of the mobile terminal itself as an operation unit of the image processing apparatus 100. The request for conducting use registration is transmitted if an instruction to activate the remote application 420 is recognized by the user interface unit 616.

The in-use function management unit 612 records functions of the image processing apparatus 100 that the user is trying to use at the present in the flash memory 414.

More specifically, if the copy screen 510 is displayed by the user interface unit 616 based on an operation on the operation panel 415, it recognizes that the user is in "the state of trying to use the copy function" and records the copy function as the in-use function. Similarly, if the scan screen 520 is displayed, it recognizes that the user is in "the state of trying to use the scan function" and records the scan function as the in-use function. Moreover, if the fax screen 530 is displayed, it recognizes that the user is in "the state of trying to use the fax function" and records the fax function as the in-use function. Furthermore, if the print screen 540 is displayed, it recognizes that the user is in "the state of trying to use the print function" and records the print function as the in-use function.

When a display screen currently displayed is switched based on a user operation, a record as the in-use function corresponding to the display screen is deleted, and a function corresponding to a newly displayed display screen is recorded as the in-use function.

For example, upon switching from the copy screen 510 to the scan screen 520, the copy function is deleted as the in-use function, and the scan function is newly recorded by the in-use function management unit 612.

When the instruction to execute the job is recognized by the user interface unit 616 based on an operation on the operation panel 415, the job execution request unit 613 reports an instruction to execute the job to the job execution acceptance unit 603 of the image processing apparatus 100.

The error information receive unit 614 receives an error report from the error information reporting unit 606 of the image processing apparatus 100. The error information display control unit 615 compares an error report received in the error information reception unit 614 and the present in-use function recorded by the in-use function management unit 612 and determines whether there is a need to display error information included in the received error report. Moreover, if it determines that there is the need to display the error information, an error release guidance is created which shows, in an easy-to-understand manner, a procedure for releasing an error which occurs in the image processing apparatus 100 to cause the created results in association with the error information to be displayed by the user interface unit 616.

The user interface unit 616 reports screen information on a display screen to be displayed to the display control unit (OS unit) 621 included in the OS layer 620 of the mobile terminals 110-130. Moreover, it specifies the image processing function to be executed based on a command which indicates various operations of the user that are received from the input control unit (OS unit) 622 included in the OS layer 620 of the mobile terminals 110-130.

The display control unit (OS unit) 621 performs screen display control based on screen information reported from the user interface unit 616. The input control unit (OS unit) 622 reports various operations of the user on the operation panel 415 of the mobile terminals 110-130 to the user interface unit 616.

Process in Information Processing System

Figure 7:
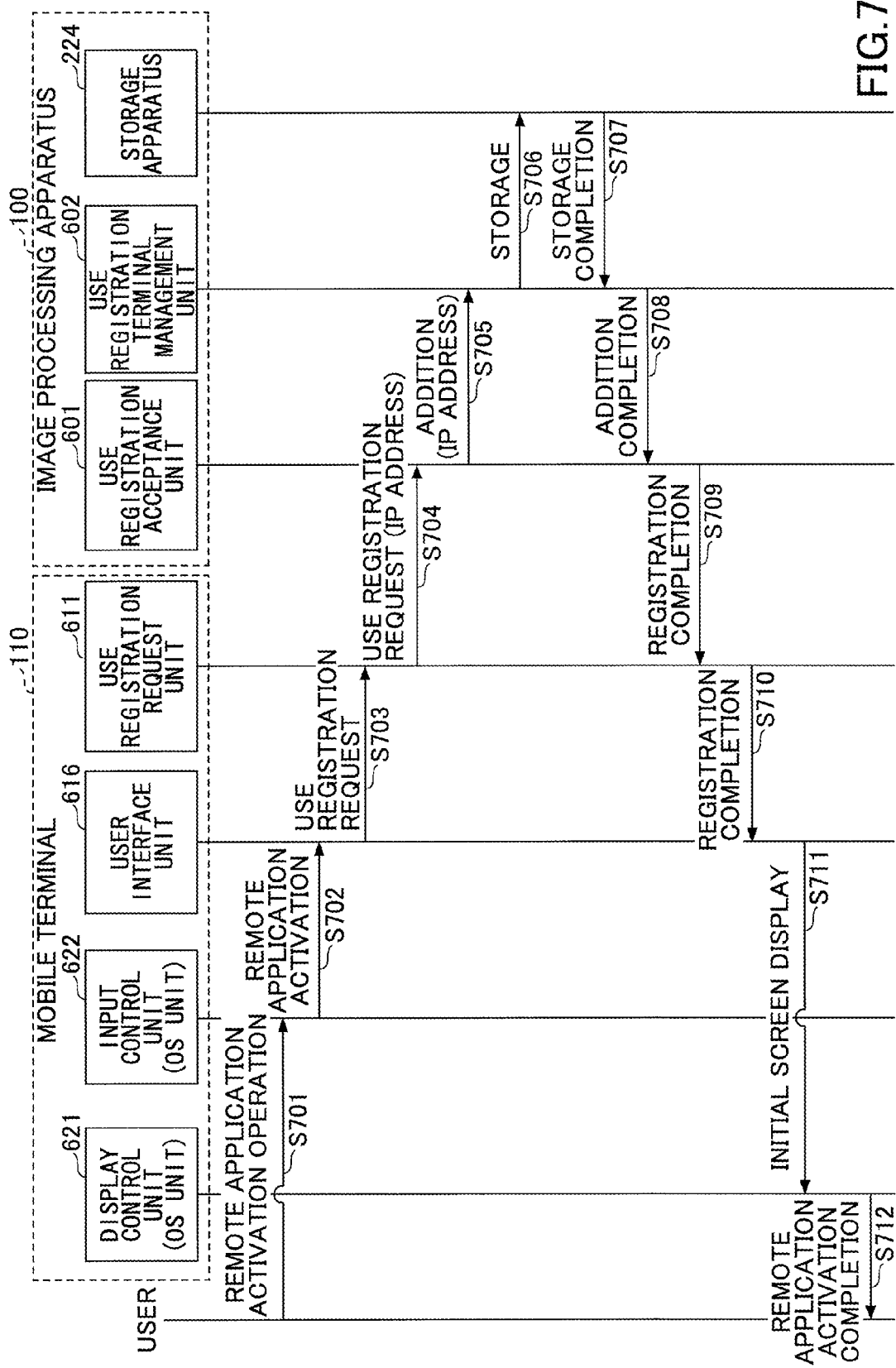
FIG. 7 is a sequence diagram illustrating a flow of a process when making use registration of the mobile terminal with the image processing apparatus.

Next, the respective processes executed for realizing the error display function in the information processing system are described. In the information processing system, in order to realize the error display function, the processes shown below are executed:

Use registration process
Job execution process
Error reporting process
Error information display process
Flow of Use Registration Process First, a flow of the use registration process is described. FIG. 7 is a sequence diagram illustrating a flow of the use registration process which is executed in the image processing system. In FIG. 7, while a case in which use registration of the mobile terminal 110 with the image processing apparatus 100 is performed is described for convenience of explanations, the same also applies to cases in which the use registration of mobile terminals 120 and 130 is performed.

As shown in FIG. 7, an operation for activating the remote application 420 on the mobile terminal 110 that is performed by the user of the mobile terminal 110 (step S701) is accepted by the input control unit (OS unit) 622. Then, it is reported to the user interface unit 616 (step S702).

The user interface unit 616, upon recognizing an instruction to activate the remote application 420, makes a use registration request to the use registration request unit 611 (step S703). In this way, the mobile terminal 110 accepts the operation for activating the remote application 420 to operate to perform use registration with the image processing apparatus 100.

The use registration request unit 611 makes the use registration request to the use registration acceptance unit 601 of the image processing apparatus 100, including therein an IP address of the mobile terminal 110 (step S704). The use registration acceptance unit 601 which accepted the use registration request instructs the use registration terminal management unit 602 to perform additional use registration of the mobile terminal 110. The use registration terminal management unit 602 registers the IP address included in the received additional instruction with the use registration terminal table (step S705). Moreover, the use registration terminal table in which the IP address is registered is stored in the storage apparatus 224.

FIG. 8 is a diagram illustrating one example of a use registration terminal table 800 in which the IP address is registered by the use registration terminal management unit 602. As shown in FIG. 8, the IP address of the mobile terminal in which the remote application 420 is currently being activated is registered in the use registration terminal table 800.

When storage of the use registration terminal table 800 by the storage apparatus 224 is completed, the storage apparatus 224 reports storage completion to the use registration terminal management unit 602 (step S707). The use registration terminal management unit 602 to which the storage completion is reported by the storage apparatus 224 reports to the use registration acceptance unit 601 of completion of additional IP address registration (step S708).

In this way, the use registration acceptance unit 601 reports that use registration with the use registration terminal table 800 has been completed to the use registration request unit 611 of the mobile terminal 110 (step S709). The use registration request unit 611, upon receiving a report on the registration completion, reports the registration completion to the user interface unit 616 (step S710).

Upon receiving the report on the registration completion from the use registration request unit 611, the user interface unit 616 instructs the display control unit (OS unit) 621 to display the initial screen 500 of the application (step S711).

In this way, the display control unit (OS unit) 621 displays the initial screen 500 of the application on the operation panel 415. As a result, the user of the mobile terminal 110 recognizes that activation of the remote application 420 has been completed (step S712).

In this way, the mobile terminal 110 makes a request for use registration to the image processing apparatus 100 with an operation to activate the remote application 420 as a trigger. Then, conditionally on the completion of the use registration request, the initial screen 500 of the remote application 420 is displayed on the operation panel 415.

Flow of Job Execution Process

Figure 9:
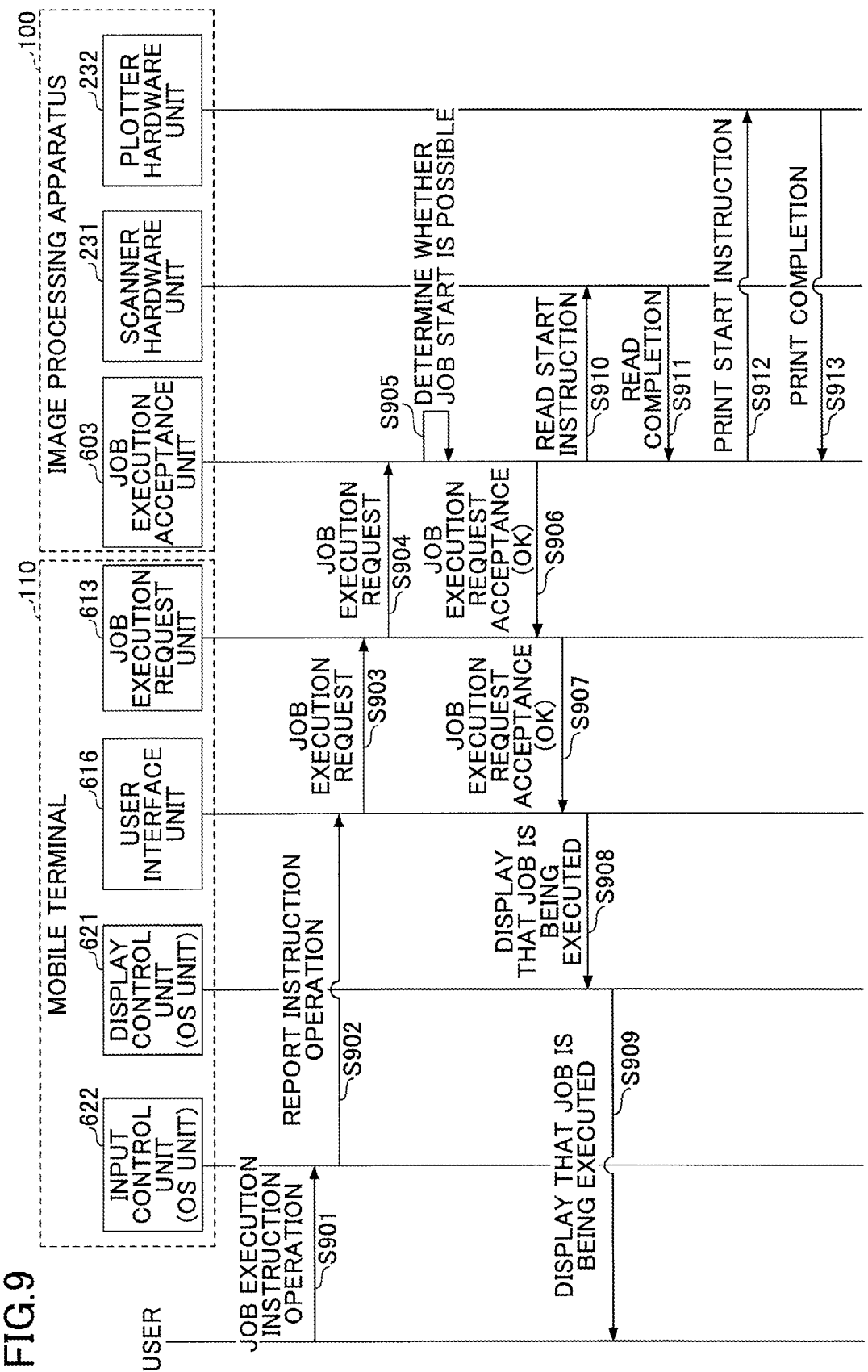
FIG. 9 is a sequence diagram illustrating a flow of a process for the mobile terminal to instruct the image processing apparatus to execute a job.

Next, a flow of the job execution process in the information processing system is described. FIG. 9 is a sequence diagram illustrating a flow of the job execution process in the information processing system.

As shown in FIG. 9, an operation instructing a job execution on the mobile terminal 110 that is performed by the user of the mobile terminal 110 (step S901) is accepted by the input control unit (OS unit) 622 and is reported to the user interface unit 616 (step S902).

As described above, when inputting of various setting values are completed in the respective copy screen 510 to print screen 540 in FIG. 5, a start button (not shown) is displayed. Upon the user pressing the start button, the input control unit (OS unit) 622 recognizes that the operation instructing a job execution is made.

Upon recognizing the instruction to execute the job, the user interface unit 616 makes a request for job execution to the job execution request unit 613. Upon receiving the request for job execution, the job execution request unit 613 makes a request for job execution to the job execution acceptance unit 603 of the image processing apparatus 100. Here, the job execution request unit 613 is to make a request for executing a copy job.

Upon accepting the job execution request, the job execution acceptance unit 603 determines whether starting the job execution requested is possible (step S905). If it is determined, as a result of the determining, that starting the job execution is possible, the job execution acceptance unit 603 transmits, to the job execution request unit 613, an OK report indicating that the request to execute the job has been accepted (step S906).

The job execution request unit 613, upon receiving the OK report, transmits, to the user interface unit 616, an OK report indicating that the request to execute the job has been accepted in the image processing apparatus 100 (step S907).

The user interface unit 616, upon receiving the OK report, instructs the display control unit (the OS unit) 621 to make a display which indicates that the job is being executed (step S908). In response thereto, the display control unit (the OS unit) 621 makes the display in the operation panel 415 that indicates that the job is being executed (step S909). As a result, the user recognizes that the execution of the job has started.

On the other hand, in parallel with performing OK reporting to the job execution request unit 613, the job execution acceptance unit 603 provides the scanner hardware unit 231 with an instruction to start reading (step S910). Upon receiving the instruction to start reading from the job execution acceptance unit 603, the scanner hardware unit 231 executes scanning and, once the scanning is completed, provides a reading completion report to the job execution instruction unit 603 (step S911).

The job execution acceptance unit 603, upon receiving the reading completion report, transmits, to the plotter hardware unit 232, a print start instruction for printing a scanned document (step S912).

The plotter hardware unit 232 receiving the print start instruction, executes printing upon receiving the print start instruction from the job execution acceptance unit 603 and provides a print completion report upon completing the printing (step S913).

Error Reporting Process

Figure 10:
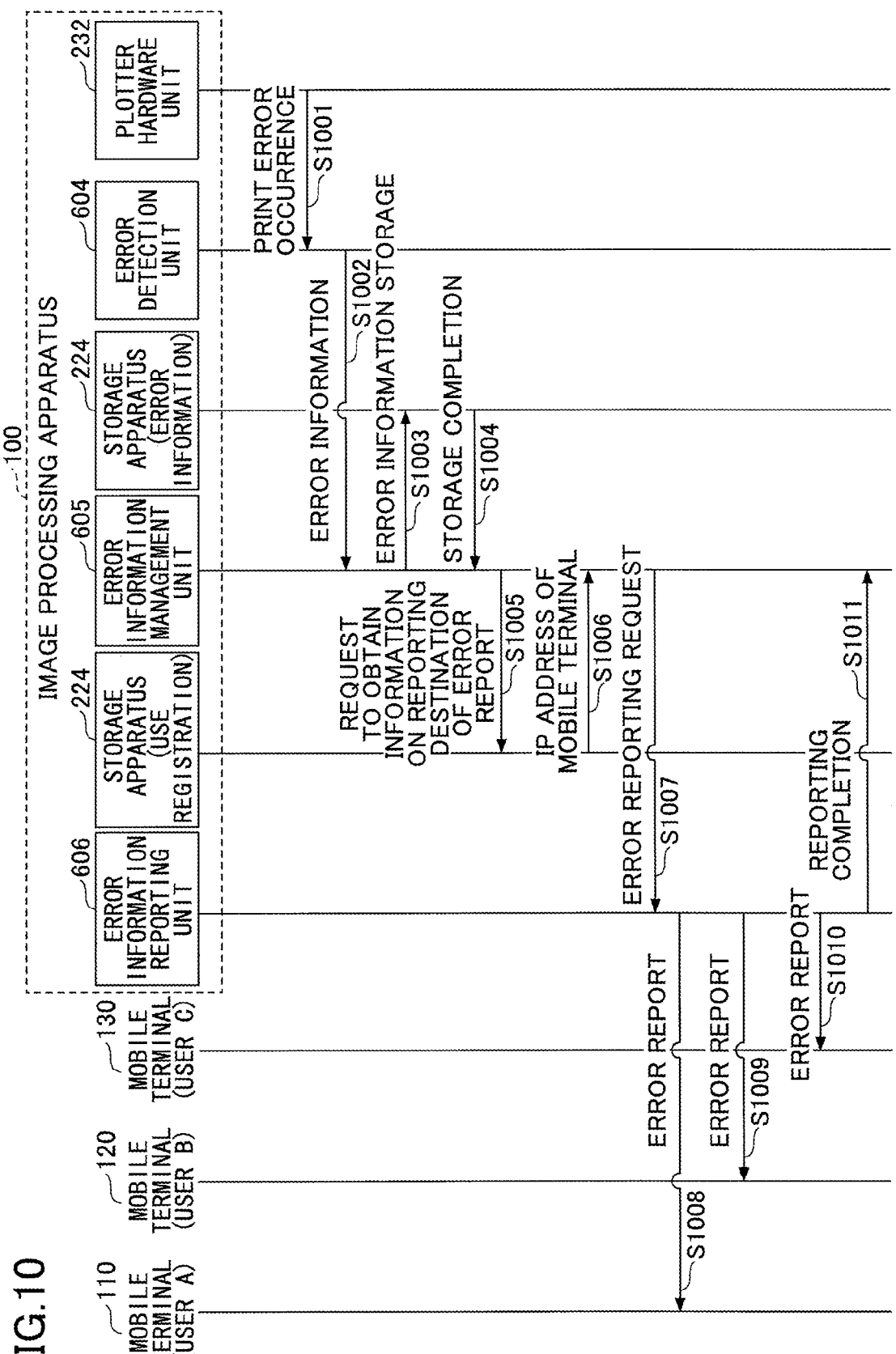
FIG. 10 is a sequence diagram illustrating a flow of a process when an error occurs in the image processing apparatus.

Next, a flow of an error reporting process when an error occurs during the job execution is described. FIG. 10 is a sequence diagram illustrating a flow of an error reporting process which is executed in an information processing system. An example in FIG. 10 shows a case in which a print error occurs in the plotter hardware unit 232.

As shown in FIG. 10, when the print error occurs in the plotter hardware unit 232, the error detection unit 604 detects the occurrence of the print error (step S1001). The error detection unit 604, upon detecting the occurrence of the print error, sends error information to the error information management unit 605 (step S1002).

The error information management unit 605, upon receiving the error information, stores the received error information in the error information management table of the storage apparatus 224 (step S1003). FIG. 11 is a diagram illustrating one example of an error information management table 1100 in which is stored error information by the error information management unit 605. As shown in FIG. 11, error overview information (information indicating an overview of the error) and error details information (information indicating details of the error) are stored in the error information management table 1100.

When the error information management table 1100 is stored in the storage apparatus 224, the storage unit 224 provides the error information management unit 605 with a report on completion of storage (step S1004). The error information management unit 605, upon receiving the report on the completion of the storage, provides the storage apparatus 224 with a request to obtain information on a reporting destination of an error report (step S1005). The image processing apparatus 100 is configured to perform error reporting to an IP address of a mobile terminal registered in the use registration terminal table 800 at the time of performing the error reporting.

Therefore, the error information management unit 605 obtains, as a reporting destination of the error report, the IP address of the mobile terminal registered in the use registration terminal table 800 stored in the storage apparatus 224 (step S1006).

Upon obtaining information on the reporting destination of the error report, the error information management unit 605 provides a request for error reporting to the error information reporting unit 606 to perform error reporting to the reporting destination (step S1007). The request for the error reporting is to include error information and an IP address.

Upon receiving the request for the error report, the error information reporting unit 606 performs the error reporting with a mobile terminal of the IP address included in the request as the reporting destination. In an example in FIG. 10, a case is shown in which the IP address for the mobile terminals 110-130 is registered in the use registration terminal table 800.

In other words, the error information reporting unit 606 performs the error reporting to the mobile terminals 110-130 (steps S1008-S1010). Moreover, the error information reporting unit 606 reports, to the error information management unit 605, that error reporting has been completed (step S1011).

Flow of Process of Displaying Error Information

Figure 12:
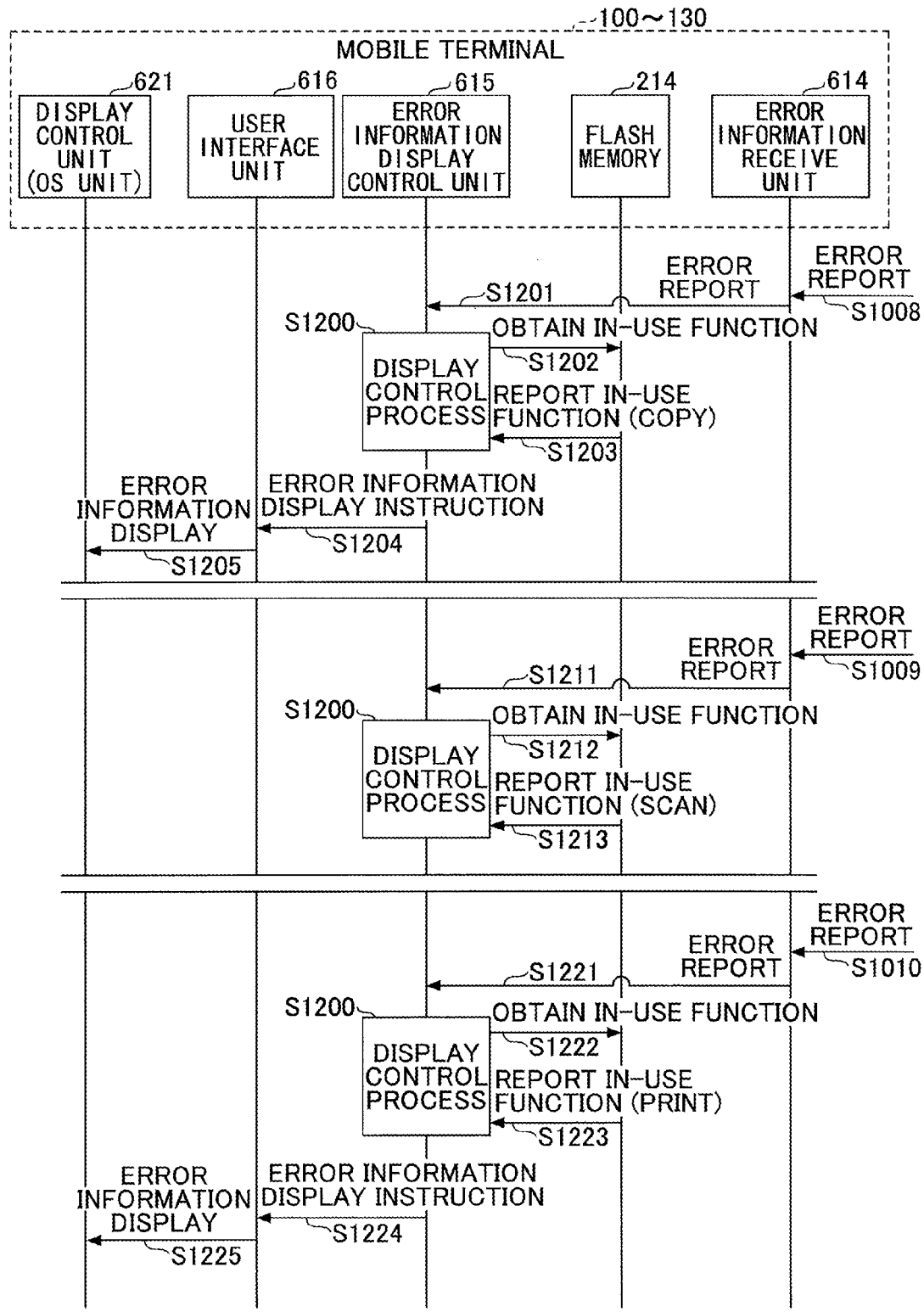
FIG. 12 is a sequence diagram illustrating a flow of a process when an error occurs in the image processing apparatus.

Next, a flow is described for a process of displaying error information when an error report is received. FIG. 12 is a sequence diagram illustrating a flow for the process of displaying error information that is executed in the information processing system. In an example in FIG. 11 is shown a case in which error reporting (the error reporting including a print error as error information) to the respective mobile terminals 110-130 is performed.

Upon receiving the error report from the error information reporting unit 606 of the image processing apparatus 100

(step S1008), the error information receive unit 614 transmits the error report to the error information display control unit 615 (step S1201).

Upon receiving the error report, the error information display control unit 615 executes a display control process (details described below) of step S1200. In executing the display control process (step S1200), the error information display control unit 615 obtains an in-use function which is currently in use in the mobile terminal 110. More specifically, it obtains an in-use function recorded in the flash memory 214. In the example in FIG. 11, a copy function is to be recorded as the in-use function. Therefore, the error information display control unit 615 receives a report that the copy function is recorded as the in-use function (step S1203).

Upon receiving the report that the copy function is recorded as the in-use function, the error information display control unit 615 compares error information (a print error) included in the error report transmitted from the error information receiving unit 614 and the in-use function received from the flash memory 214. In this way, it is determined whether error information included in the error report transmitted is related to the in-use function.

Here, the print error is related to the copy function, so that the error information display control unit 615 determines that error information included in the error report transmitted is related to the in-use function and instructs the user interface unit 616 to display the error information (step S1204).

Upon receiving the instruction to display the error information, the user interface unit 616 instructs the display control unit (OS unit) 621 to display the error information (step S1205). As a result, the user of the mobile terminal 110 recognizes that the print error has occurred in the image processing apparatus 100. If an instruction to display error release guidance information is input by a user for error information displayed based on instructions for displaying the error information, the error release guidance information is displayed based on the instructions for displaying.

On the other hand, upon receiving the error report from the error information reporting unit 606 (step S1009), the error information receive unit 614 of the mobile terminal 120 transmits the error report to the error information display control unit 615.

Upon receiving the error report, the error information display control unit 615 executes a display control process (details are described below) of step S1200. In executing the display control process (step S1200), the error information display control unit 615 obtains the function currently in use in the mobile terminal 120. More specifically, it obtains the in-use function recorded in the flash memory 214 (step S1212). In an example in FIG. 12, a scan function is to be recorded as the in-use function. Thus, the error information display control unit 615 receives a report that the scan function is recorded as the in-use function (step S1213).

Upon receiving the report that the scan function is recorded as the in-use function, the error information display control unit 615 compares error information (a print error) included in the error report transmitted from the error information receive unit 614 and the in-use function received from the flash memory 214. In this way, it is determined whether error information included in the error report transmitted is related to the in-use function.

Here, the print error is not related to the scan function, so that the error information display control unit 615 determines that the error information included in the error report transmitted is not related to the in-use function and does not display the error information.

On the other hand, upon receiving the error report from the error information reporting unit 606 (step S1010), the error information receive unit 614 of the mobile terminal 130 transmits the error report to the error information display control unit 615.

Upon receiving the error report, the error information display control unit 615 executes a display control process (details are described below) of step S1200. In executing the display control process (step S1200), the error information display control unit 615 obtains the function currently in use in the mobile terminal 130. More specifically, it obtains the in-use function recorded in the flash memory 214 (step S1222). In an example in FIG. 11, a print function is to be recorded as the in-use function. Thus, the error information display control unit 615 receives a report that the print function is recorded as the in-use function (step S1223).

Upon receiving the report that the print function is recorded as the in-use function, the error information display control unit 615 compares error information (a print error) included in the error report transmitted from the error information receive unit 614 and the in-use function received from the flash memory 214. In this way, it is determined whether error information included in the error report transmitted is related to the in-use function.

Here, the print error is related to the print function, so that the error information display control unit 615 determines that error information included in the error report transmitted is related to the in-use function and then instructs the user interface unit 616 to display the error information (step S1224).

Upon receiving the instruction to display the error information, the user interface unit 616 instructs the display control unit (OS unit) 621 to display the error information (step S1225). As a result, the user of the mobile terminal 130 recognizes that the print error has occurred in the image processing apparatus 100. If an instruction to display error release guidance information is input by a user for error information displayed based on instructions for displaying the error information, the error release guidance information is displayed based on the display instruction.

Display Control Process in Mobile Terminal

Next, details of the display control process (step S1200) in the error information display control unit 615 of the mobile terminals 110-130 are described using FIGS. 13-16.

Figure 13:
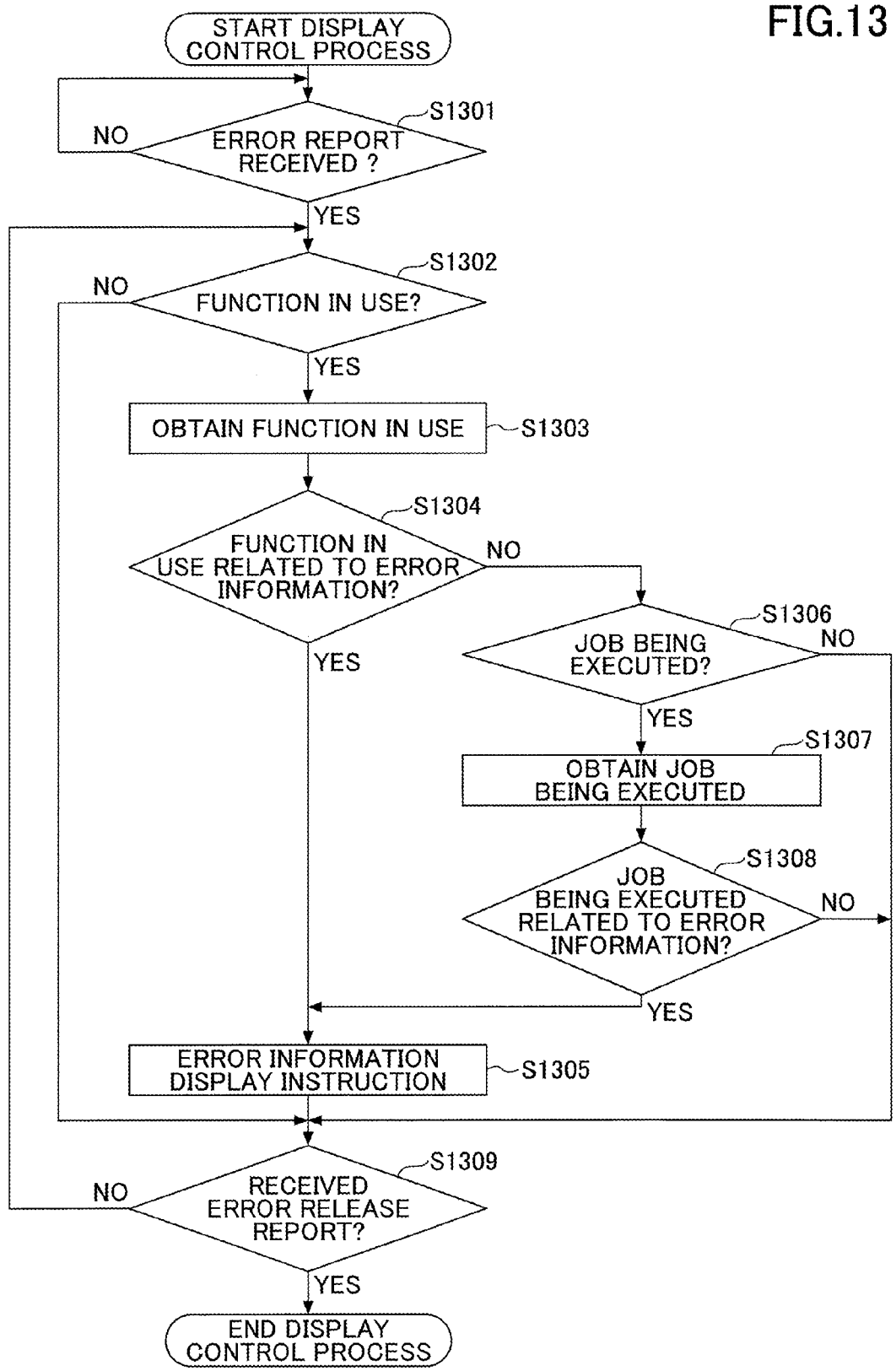
FIG. 13 is a flowchart illustrating a flow of a display control process in the mobile terminal.

FIG. 13 is a flowchart illustrating a detailed flow of a display control process (step S1200) in the error information display control unit 615 of the mobile terminals 110-130. In step S1301, the error information receiving unit 614 determines whether the error report is received from the error information reporting unit 606 of the image processing apparatus 100. If it determines that the error report has not been received, it waits until it receives the error report.

On the other hand, if it determines that the error report has been received, the process proceeds to step S1302 in which it is determined whether there is an in-use function. If it is determined that there is no in-use function in step S1302, the process proceeds to step S1309 to determine whether the error release report has been received. If it is determined that the error release report has not been received in step S1309, the process returns to step S1302 and continues the display control process. On the other hand, if it determines that the error release report is received, the display control process is completed and waits for the next error report to be transmitted.

On the other hand, if it is determined that there is an in-use function in step S1302, the process proceeds to step S1303, in which the in-use function is obtained.

Moreover, in step S1304, the in-use function, and error information included in the error report are compared and it is determined whether the error information is related to the in-use function. FIG. 14 is a table showing whether the error information is related to the in-use function. As shown in FIG. 14, the copy function uses the scanner hardware unit 231 and the plotter hardware unit 232. Thus, both the error information in case an error occurs in the scanner hardware unit 231 and the error information in case an error occurs in the block hardware unit 232 are related thereto.

On the other hand, scan and fax functions use the scanner hardware unit 231. Thus, only error information when an error occurs in the scanner hardware unit 231 is related.

Moreover, a print function uses the plotter hardware unit 232. Thus, only error information when an error occurs in the plotter hardware unit 232 is related.

If it is determined that the error information is related to the in-use function in step S1304, the process proceeds to step S1305, where the user interface unit 616 is instructed to display the error information.

Figure 15:
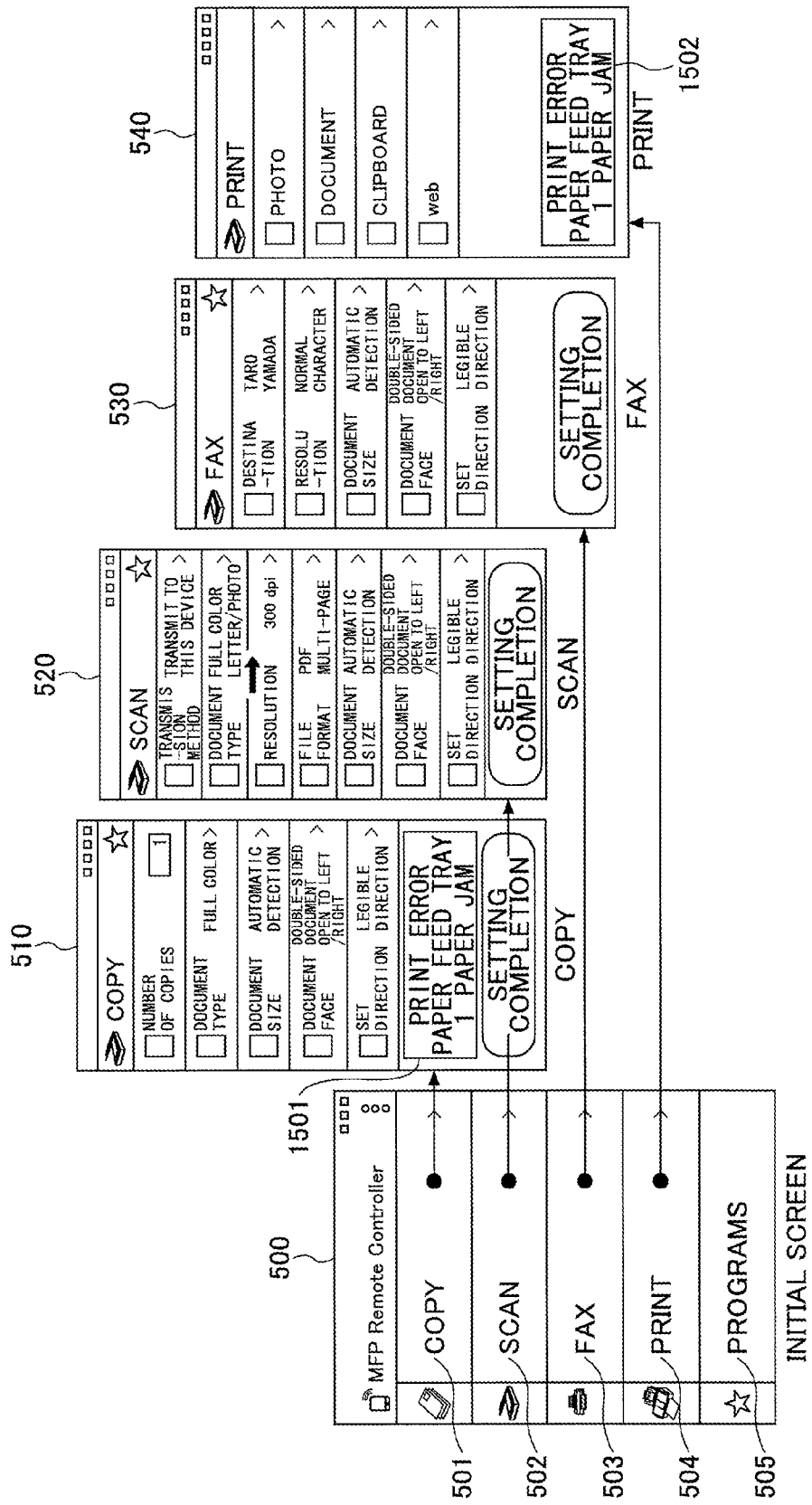
FIG. 15 is a diagram illustrating one example of the error information displayed in the mobile terminal.

FIG. 15 is a diagram illustrating one example of error information displayed on an operation panel 415 upon receiving an instruction to display error information (print error). (For brevity of explanations, displaying of error release guidance information is omitted.)

For the print error, the copy and print functions are related. Thus, when the copy screen 510 is displayed, error information 1501 is displayed. Moreover, when the print screen 540 is displayed, error information 1502 is displayed.

Switching to the scan screen 520 or the fax screen, or the initial screen 500 causes the error information 1501 displayed in the copy screen 510 to be not displayed. This is because the scan function and the fax function are not related to the print error. Moreover, returning to the copy screen 510 causes it to be displayed again. The error information 1501 continues to be displayed until the error is released.

Similarly, switching to the scan screen 520 or the fax screen 530, or the initial screen 500 causes the error information 1502 displayed in the print screen 540 to not be displayed. Moreover, returning to the print screen 540 causes it to be displayed again. The error information 1502 continues to be displayed until the error is released.

In this way, from when the error report is received to when the error release report is received, the error information display control unit 615 manages an error which occurred in the image processing apparatus 100 and compares the in-use function and the error information as required. Then, the error information is displayed if it is determined that they are related and are not displayed if it is determined that they are not related.

Returning to FIG. 13, if it is determined that the error function is not related to the in-use function in step S1304, the process proceeds to step S1306. In step S1306, it is determined whether a job is being executed. As described using FIG. 9, from when the user performs an operation for instructing execution of a job on a mobile terminal to when execution completion of the job is reported from the image processing apparatus 100, the mobile terminal recognizes that the job which is instructed to be executed is being executed by the image processing apparatus 100.

Therefore, in step S1306, it is determined whether there is a job which is recognized as being executed. If it is determined that there is no job which is recognized as being executed, the process proceeds to step S1309, where it is determined whether the error release report is received. If it is determined that the error release report is not received in step S1309, the process returns to step S1302, where the display control process is continued. On the other hand, if it is determined that the error release report is received, the display control process is completed and the mobile terminal waits for the next error report to be transmitted.

If it is determined that there is a job which is recognized as being executed, the process proceeds to step S1307, where the type of the job being executed is identified.

Moreover, in step S1308, the type of the job being executed and the error information are compared to determine whether the error information is related to the job being executed. Determining whether the error information is related to the job being executed is the same as determining in step S1304, repeated explanations are omitted here.

If it is determined that the error information is related to the job being executed in step S1308, the process proceeds to step S1305, where the user interface unit 616 is instructed to display the error information.

Figure 16:
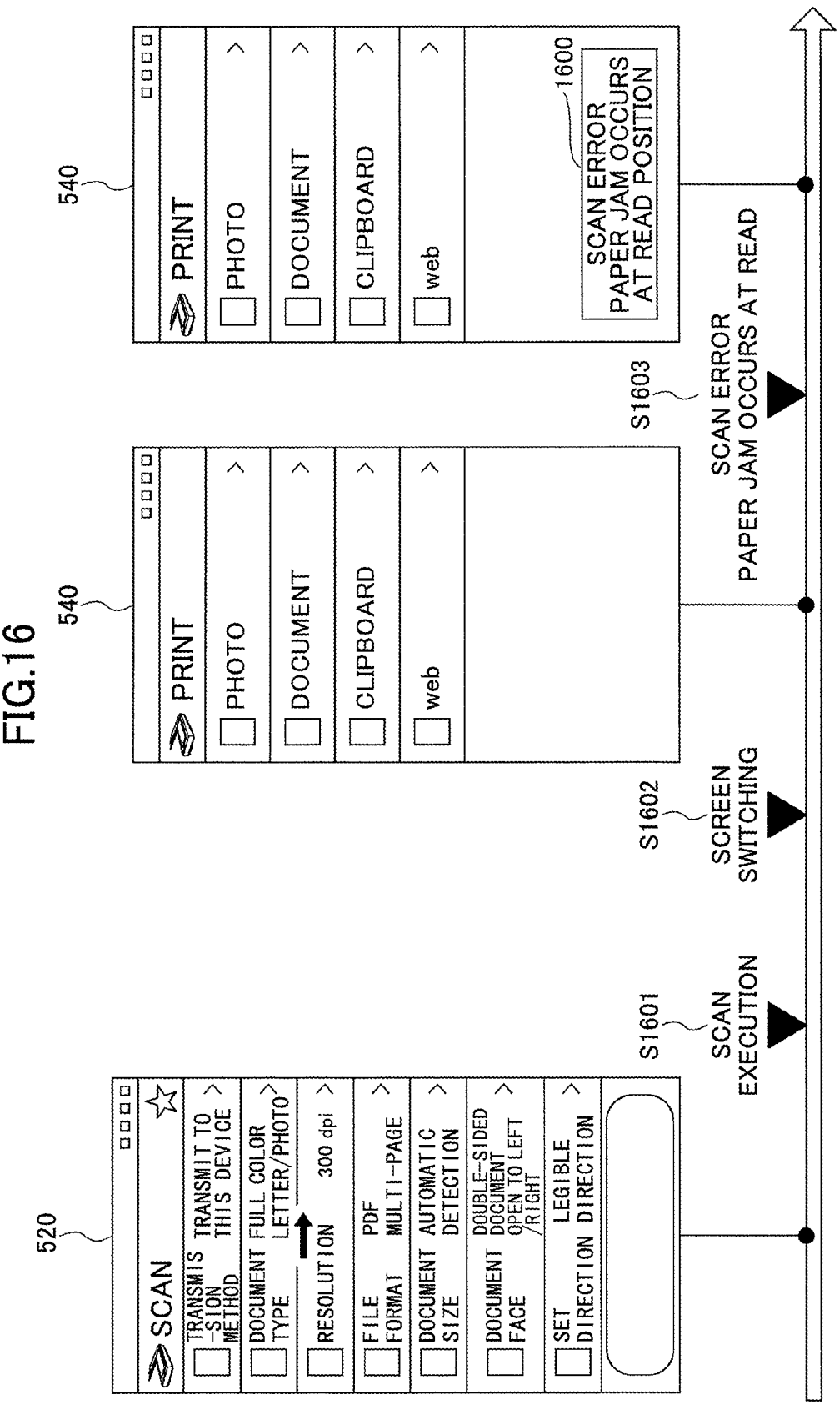
FIG. 16 is a diagram illustrating a relationship between switching of the display screen in the mobile terminal and displaying/non-displaying of the error information.

FIG. 16 is a diagram illustrating a relationship between switching of the display screen in the mobile terminal and the error information displayed; an example in FIG. 16 shows a case in which an error occurs in the scanner hardware unit 231 while switching to the print screen 540 after starting execution of a scan job.

As shown in FIG. 16, input of various setting values are completed in the scan screen 520 and a start button is pressed to cause a scan job to be executed (step S1601). It is assumed that the user switched from the scan screen 520 to the print screen 540 (step S1602).

It is assumed that, immediately after switching to the print screen 540, execution of the scan job is not completed and the scan job is being executed in the image processing apparatus. When a scan error occurs in the image processing apparatus 100 (step S1603), the error information display control unit 615 determines that a job is being executed in the image processing apparatus 100 at the time of receiving the error report. Moreover, it is determined that the received error information (read paper jam) is related to a job (a scan job) being executed and instructs the user interface unit 616 to display the error information. In this way, in print screen 540 error information 1600 is displayed.

In this way, even when the error information is not related to the in-use function, the error information display control unit 615 displays error information when an error occurs during execution of a job based on an execution instruction from an own terminal.

Returning to FIG. 13, if it is determined that the error information is not related to the job being executed in step S1308, the process proceeds to step S1309, where it is determined whether an error release report is received. If it is determined that the error release report is not received in step S1309, the process returns to step S1302. On the other hand, if it is determined that the error release report is received, the display control process is completed and the mobile terminal waits for the next error report to be transmitted.

In this way, from when the error report is received to when the error release report is received, the error information display control unit 615 manages an error which occurred in the image processing apparatus 100 and compares the job being executed and the error information as required. Then, the error information is displayed if it is determined that they are related and are not displayed if it is determined that they are not related.

As described above, when an error report is received, the mobile terminals 110-130 takes into account the relationship between the error information and the in-use function and the relationship between the error information and the job being executed to determine displaying/non-displaying of the error information. Moreover, the determination is continually performed from when the error report is received and when the error release report is received.

This makes it possible to avoid error information being displayed on a mobile terminal of a user which performs an operation not related to the error.

SUMMARY

As evident from the above explanations, the image processing apparatus 100 according to the present embodiment is arranged to register an IP address of a mobile terminal with a use registration terminal table when a request for use registration from the mobile terminal is accepted and is arranged to refer to the use registration terminal table if an error occurs and error reporting is made to the IP address registered at the time of occurrence of the error.

This makes it possible even for a mobile terminal other than a mobile terminal which instructed a job execution to receive an error report.

On the other hand, a reporting destination of the error report is restricted to a mobile terminal which is registered with the use registration terminal table, making it possible to avoid a situation such that error reporting is made to a user which does not need the error reporting. Moreover, the error reporting can be made in a shorter time compared to when making a broadcast transmission to a mobile terminal which can communicate therewith. Moreover, the processing burden of the image processing apparatus 100 can be reduced at the time of error reporting.

Moreover, in the mobile terminals (image processing apparatuses) 110-130 according to the present embodiment is configured to, when an error report is received, take into account the relationship between the error information included and the in-use function and the relationship between the error information included in the error report and the job being executed to determine displaying/non-displaying of the error information.

This makes it possible to avoid error information being displayed on a mobile terminal of a user which performs an operation not related to an error.

Consequently, this makes it possible to improve convenience of a user which controls an image processing apparatus by a remote operation via a mobile terminal.

Second Embodiment

The above-described first embodiment is configured to make error reporting to a mobile terminal whose IP address is registered in the use registration terminal table 800 at the time of occurrence of an error. Therefore, for the above-described first embodiment, error reporting is not made to a mobile terminal whose IP address is not registered in the use registration terminal table 800 at the time of occurrence of the error, but registered before the error is released.

Thus, for a user of a mobile terminal which caused a remote application 420 to be activated after an occurrence of an error, it is not possible to recognize the occurrence of the error in the image processing apparatus 100, so that it is inconvenient. Therefore, the mobile terminal according to the present embodiment is arranged to make a request to obtain error information to the image processing apparatus 100 at an arbitrary timing. Below, details of the present embodiment are described.

Figure 17:
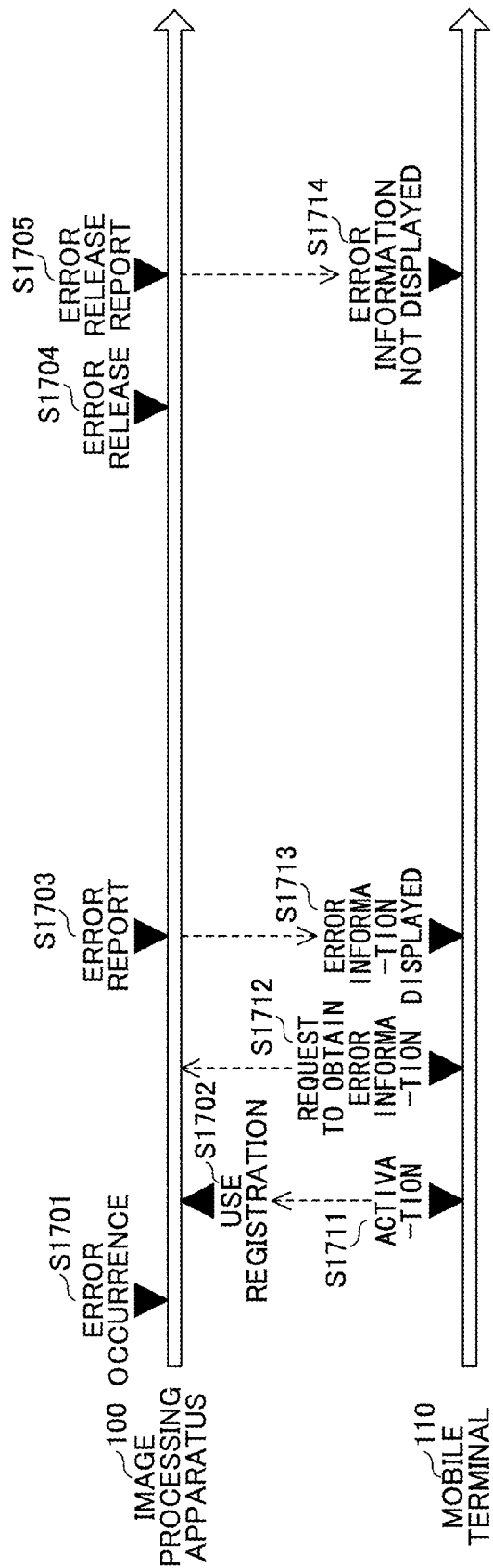
FIG. 17 is a diagram illustrating a relationship between use registration of the mobile terminal with the image processing apparatus and error reporting and error release reporting.

FIG. 17 is a diagram showing a flow of an error information display process in the mobile terminal 110 which is arranged to make it possible to make a request to obtain error information. As shown in FIG. 17, in step S1701, when an error occurs in the image processing apparatus 100, the image processing terminal 100 makes error reporting to a mobile terminal whose IP address has already been registered in the use registration table 800.

Suppose that, thereafter, the remote application 420 of the mobile terminal 110 is activated and the mobile terminal 110 makes a use registration request to the image processing apparatus 100 in step S1711. Then suppose the IP address of the mobile terminal 110 is registered in the use registration terminal table 800 of the image processing apparatus 100 (step S1702).

Then, in the image processing apparatus 100, an error occurred but error reporting has already been made, so that the image processing apparatus 100 does not make error reporting to the mobile terminal 110 automatically.

Then, the mobile terminal 110 requests to obtain error information (step S1712). Upon receiving the request to obtain the error information from the mobile terminal 110, the image processing apparatus 100 makes an error report including error information for an error occurring at the time of the receiving thereof to the requesting mobile terminal 110, which made the request to obtain the error information (step S1703).

This makes it possible for the mobile terminal 110 to receive an error report from the image processing apparatus 100. The display control process in the mobile terminal 110 after receiving the error report is the same as that for the above-described first embodiment, so that repeated explanations are omitted.

Then, when the error is released in the image processing apparatus 100 (step S1704), the image processing apparatus 100 specifies a mobile terminal whose IP address is registered in the use registration terminal table 800 at the time of releasing the error. Then, an error release report is transmitted to the specified mobile terminal (step S1705).

As the mobile terminal 110 is already registered in the use registration terminal table 800 at the time of release of the error, an error release report is received. Upon receiving the error release report, the mobile terminal 110 causes error information displayed to not be displayed.

As evident from the above explanations, the mobile terminal according to the present embodiment is arranged to be able to transmit a request for obtaining error information to an image processing apparatus in order to grasp the current error state in the image processing apparatus and to perform the same display control process as that for the first embodiment when an error report is received in response to the request for obtaining the error information.

This makes it possible to obtain error information on an error occurring in the image processing apparatus even when use registration is not made at the time of occurrence of an error. Consequently, this makes it possible to further improve convenience for a user which controls an image processing apparatus by a remote operation via a mobile terminal.

Third Embodiment

The above-described first and second embodiments are configured to make error reporting and error release reporting to a mobile terminal whose IP address is registered in the use registration terminal table 800 at the time of occurrence of an error or at the time of release of the error. However, the present invention is not limited thereto.

For example, it may be configured to not perform error reporting or error release reporting when the user desires even when the IP address is registered in the use registration terminal table 800.

FIG. 18 is a diagram showing one example of a use registration terminal table 1800 which is managed by the use registration terminal management unit 602 of the image processing apparatus 100 according to the present embodiment.

As shown in FIG. 18, whether transmission of error information is required as well as an IP address may be registered in the use registration terminal table 1800. This makes it possible for the image processing apparatus 100 to be arranged to make error reporting including error information to a mobile terminal for which whether transmission of error information is required is "required" of mobile terminals whose IP address is registered.

Consequently, when an error occurs in the image processing apparatus, error information is displayed only on a mobile terminal of a user which requires error information.

In other words, the present embodiment makes it possible to further improve convenience for a user which controls an image processing apparatus by a remote operation via a mobile terminal.

Fourth Embodiment

The first to third embodiments are arranged to prepare and display error release guidance information which shows, in an easy-to-understand manner, a procedure for releasing an error in the mobile terminals 110-130 which received an error report. However, the present invention is not limited thereto, so that it may be arranged for the error release guidance information to be prepared in the image processing apparatus 100 and transmitted to the mobile terminals 110-130 by including it in the error report.

Such arrangement makes it possible to cause most up-to-date error release guidance information to be displayed on the mobile terminals 110-130 only by updating the ROM 222 of the image processing apparatus 100 when there is a change in a procedure for releasing an error, for example. In other words, a user of the respective mobile terminals 110-130 can eliminate the burden of updating the remote application 420 every time the error release guidance information is updated.

Moreover, it may be arranged for the mobile terminals 110-130 to be able to download the error release guidance information via a network as required. In this case, there is no need for the image processing apparatus 100 to transmit the error release guidance information, and only the URL needs to be transmitted, making it possible to decrease the communications burden between the image processing apparatus 100 and the mobile terminal 110.

FIG. 19 is a diagram showing an overall configuration of an information processing system which makes it possible for the mobile terminals 110-130 to download the error release guidance information as needed via a network.

As shown in FIG. 19, the mobile terminals 110-130 are arranged to connect to the access point 1920 and to be able to access the server apparatus 1900 via a network 1910. Moreover, error release guidance information 1901 is stored in the server apparatus 1900.

The image process apparatus 100 makes error reporting including error information and an URL showing a storage destination of the error release guidance information 1901 to the mobile terminals 110-130. At the time of receiving an error report, the mobile terminals 110-130 receives the error information and the URL showing the storage destination of the error guidance information 1901. Moreover, at the time of displaying the error information, the URL is also displayed.

In this way, the user of the mobile terminals 110-130 can access the URL as needed and download the error release guidance information 1901.

While it is arranged to transmit the error release guidance information or the URL indicating the storage destination of the error release guidance information by including it in an error report with error information in the above explanations, the present invention is not limited thereto.

For example, it may be arranged to make error reporting by including therein error release guidance information or a URL with error information to a mobile terminal which made an execution instruction for a job being executed of mobile terminals registered. Moreover, it may be arranged to make error reporting by including therein only error information to a mobile terminal other than a mobile terminal which made an execution instruction for a job being executed of mobile terminals registered.

Fifth Embodiment

According to the above-described first to fourth embodiments, the image mobile apparatus 100 is arranged to restrict a reporting destination for error reporting to a mobile terminal for which use registration is made. Moreover, the mobile terminal is arranged to restrict displaying of error information only to when a related function is in use or when a related job is being executed.

However, the present invention is not limited thereto. For example, it may be arranged to successively transmit information sets on a display screen displayed in the mobile terminal to the image processing apparatus 100 and it may be arranged to specify, in the image processing apparatus 100, a mobile terminal for which error information is to be displayed. This makes it possible to make error reporting only to a mobile terminal for which error information is to be displayed.

Other Embodiments

The present invention is not limited to arrangements shown herein, including arrangements provided in the above-described embodiments in combination with other elements. These points may be changed within the range of not compromising the gist of the present invention and may be appropriately determined in accordance with the application thereof.

The present application is based on and claims the benefit of priority of Japanese Priority Application No. 2013-251077 filed on Dec. 4, 2013, the entire contents of which is hereby incorporated by reference.

The invention claimed is:

1. An information processing apparatus, comprising:
   a display configured to display a screen for controlling another apparatus to perform an operation; and
   a processor configured to,
   transmit a registration request to the other apparatus when a remote application is activated, the other apparatus including a database containing registration information of a plurality of information processing apparatuses including the information processing apparatus, receive a report of an error in the other apparatus, the error being simultaneously reported by the other apparatus to the plurality of information processing apparatuses including the information processing apparatus, the error corresponding to any operation commanded by any of the plurality of information processing apparatuses, and control displaying/non-displaying of information associated with the error on the display of the information processing apparatus, the processor being configured to control the displaying/non-displaying of the information associated with the error based on a relationship between the error and the operation, instructions for performing the operation having been provided via the screen.

2. The information processing apparatus as claimed in claim 1, wherein the processor is configured to display the information associated with the error when the error corresponds to a hardware component in the other apparatus configured to perform the operation.

3. The information processing apparatus as claimed in claim 1, wherein the processor is configured to display the information associated with the error if the error occurs while the other apparatus is performing the operation.

4. The information processing apparatus as claimed in claim 1, wherein the processor is configured to manage the error based on an error report transmitted if the error occurs in the other apparatus and an error release report transmitted if the error is released in the other apparatus.

5. The information processing apparatus as claimed in claim 4, wherein the processor is further configured to request a transmission of the information associated with the error from the other apparatus.

6. The information processing apparatus as claimed in claim 4, wherein the processor is further configured to obtain information indicating a procedure for releasing the error from a memory having the procedure stored therein.

7. The information processing apparatus of claim 1, wherein
the operation is at least one of a scanning operation, a printing operation, a copying function and a faxing operation, and
the other apparatus is a multi-functional apparatus configured to carry out the operation, and
the information processing apparatus is a mobile device.

8. The information processing apparatus of claim 1, wherein
the information processing apparatus is remotely communicating with the other apparatus, and
the information processing apparatus is configured to instruct the other apparatus to perform the operation from among a plurality of operations.

9. The information processing apparatus of claim 8, wherein the relationship is a relationship between the error and a corresponding one of the plurality of functions, instructions for which has been provided via one of the plurality of information processing apparatuses.

10. The information processing apparatus of claim 1, wherein the processor is further configured to transmit to the other apparatus, at any given time, a request for receiving the report of an error.

11. An information processing system comprising:
an image processing apparatus; and
a plurality of information processing apparatuses, each of the plurality of information processing apparatuses including,
a display configured to display a screen for controlling the image processing apparatus to perform an operation, and
a first processor configured to,
transmit a registration request to the image processing apparatus when a remote application is activated, the image processing apparatus including a database containing registration information of the plurality of information processing apparatuses,
receive a report of an error in the image processing apparatus, the error being simultaneously reported by the image processing apparatus to the plurality of information processing apparatuses, the error corresponding to any operation commanded by any of the plurality of information processing apparatuses, and
control displaying/non-displaying of information associated with the error on the display of the information processing apparatus, the processor being configured to control the displaying/non-displaying of the information associated with the error based on a relationship between the error and the operation, instructions for performing the operation having been provided via the screen, wherein
the image processing apparatus includes a second processor configured to,
register the plurality of information processing apparatuses,
specify the plurality of registered information processing apparatuses when the error is detected, and
provide the information associated with the error to the registered information processing apparatuses.

12. The information processing system as claimed in claim 11, wherein the second processor is further configured to,
specify the plurality of registered information processing apparatuses when the error is released, and
provide an error release report to the specified plurality of information processing apparatuses.

13. The information processing system as claimed in claim 11, wherein, when a request for obtaining the information associated with the error is received from one or more of the plurality of information processing apparatuses, the second processor is configured to provide the error information to the one or more of the plurality of information processing apparatuses.

14. The information processing system as claimed in claim 11, wherein
the second processor is further configured to register whether transmission of the information associated with the error is required, and
provide the information associated with the error to the specified plurality of information processing apparatuses in accordance with whether the transmission of the information associated with the error is required.

15. The information processing system as claimed in claim 11, wherein the second processor is configured to provide the information associated with the error as well as indicate a procedure for fixing the error.

16. The information processing system as claimed in claim 11, wherein the procedure is stored on a memory.

17. The information processing system of claim 11, wherein the first processor is further configured to transmit to the image processing apparatus, at any given time, a request for receiving the report of an error.

18. An information processing method in an information processing system which includes a plurality of information processing apparatuses and an image processing apparatus, the method comprising:
- transmitting, by one of the plurality of information processing apparatuses, a registration request to the image processing apparatus when a remote application is activated, the image processing apparatus including a database containing registration information of the plurality of information processing apparatuses;
- receiving, at the one of the plurality of information processing apparatuses, a report of an error in the image processing apparatus, the error being simultaneously reported by the image processing apparatus to the plurality of information processing apparatuses, the error corresponding to any operation commanded by any of the plurality of information processing apparatuses; and
- controlling, at the one of the plurality of information processing apparatuses, displaying/non-displaying of information associated with the error on a display of the one of the plurality of information processing apparatuses, the controlling being based on a relationship between the error and an operation, instructions for performing the operation having been provided via the display.

19. The information processing method of claim 18, further comprising:
- transmitting to the image processing apparatus, at any given time, a request for receiving the report of an error.

* * * * *